United States Patent
Nakamoto et al.

(10) Patent No.: US 8,260,463 B2
(45) Date of Patent: Sep. 4, 2012

(54) ROBOT SYSTEM

(75) Inventors: Zenta Nakamoto, Fukuoka (JP); Kenji Matsukuma, Fukuoka (JP); Hiroyuki Handa, Fukuoka (JP)

(73) Assignee: Kabushiki Kaisha Yaskawa Denki, Kitakyushu-Shi, Fukuoka (JP)

( * ) Notice: Subject to any disclaimer, the term of this patent is extended or adjusted under 35 U.S.C. 154(b) by 888 days.

(21) Appl. No.: 12/278,047

(22) PCT Filed: Jan. 19, 2007

(86) PCT No.: PCT/JP2007/050750
§ 371 (c)(1),
(2), (4) Date: Aug. 1, 2008

(87) PCT Pub. No.: WO2007/088735
PCT Pub. Date: Aug. 9, 2007

(65) Prior Publication Data
US 2009/0173560 A1 Jul. 9, 2009

(30) Foreign Application Priority Data

Feb. 2, 2006 (JP) ................................. 2006-025865

(51) Int. Cl.
*G05B 15/00* (2006.01)
*G05B 19/00* (2006.01)
(52) U.S. Cl. .......................................... 700/259
(58) Field of Classification Search .................. 700/245, 700/250, 253, 258–261; 318/568.1; 623/58, 623/63–65; 901/32–34, 46–47
See application file for complete search history.

(56) References Cited

U.S. PATENT DOCUMENTS

| | | | | |
|---|---|---|---|---|
| 4,957,320 A | * | 9/1990 | Ulrich | 294/106 |
| 5,092,645 A | * | 3/1992 | Okada | 294/86.4 |
| 5,263,375 A | * | 11/1993 | Okada | 73/862.042 |
| 5,501,498 A | * | 3/1996 | Ulrich | 294/106 |

(Continued)

FOREIGN PATENT DOCUMENTS

JP 06-126684 A 5/1994

(Continued)

OTHER PUBLICATIONS

International Search Report of PCT/JP2007/050750, date of mailing Feb. 27, 2007.

*Primary Examiner* — Khoi Tran
*Assistant Examiner* — Harry Oh
(74) *Attorney, Agent, or Firm* — Westerman, Hattori, Daniels & Adrian, LLP

(57) ABSTRACT

A robot control section (7) has an object information calculation section (21) for calculating, based on image information from an image processing section (8), the size and shape of an object to he held; a holding method determination section (22) for determining, based on the object information calculated, a method for holding the object; a holding execution section (23) for executing lifting of the object by the holding method determined; a sensor information processing section (24) for processing pieces of sensor information and controlling holding force, the pieces of sensor information being those obtained at the time of the execution, the processing of the pieces of sensor information being made for each combination of one or more of the pieces of information; and a holding method correction section (25) for correcting, based on the result of the processing, the pieces of sensor information, the method of holding the object.

10 Claims, 21 Drawing Sheets

U.S. PATENT DOCUMENTS

| | | | |
|---|---|---|---|
| 5,513,106 A * | 4/1996 | Yoshino et al. | 701/23 |
| 6,802,382 B2 * | 10/2004 | Hattori et al. | 180/8.6 |
| 7,443,115 B2 * | 10/2008 | Okamoto et al. | 318/100 |
| 7,706,918 B2 * | 4/2010 | Sato et al. | 700/245 |
| 7,787,993 B2 * | 8/2010 | Takahashi | 700/262 |
| 7,822,508 B2 * | 10/2010 | Sugiyama et al. | 700/245 |
| 2006/0129278 A1 * | 6/2006 | Sugiyama et al. | 700/245 |
| 2006/0142896 A1 * | 6/2006 | Yokoyama et al. | 700/245 |
| 2008/0231221 A1 * | 9/2008 | Ogawa | 318/568.12 |

FOREIGN PATENT DOCUMENTS

| | | |
|---|---|---|
| JP | 2004-188533 A | 7/2004 |
| JP | 2004-345030 A | 12/2004 |
| JP | 2005-169564 A | 6/2005 |
| JP | 2005169564 A * | 6/2005 |
| JP | 2005-262411 A | 9/2005 |

* cited by examiner

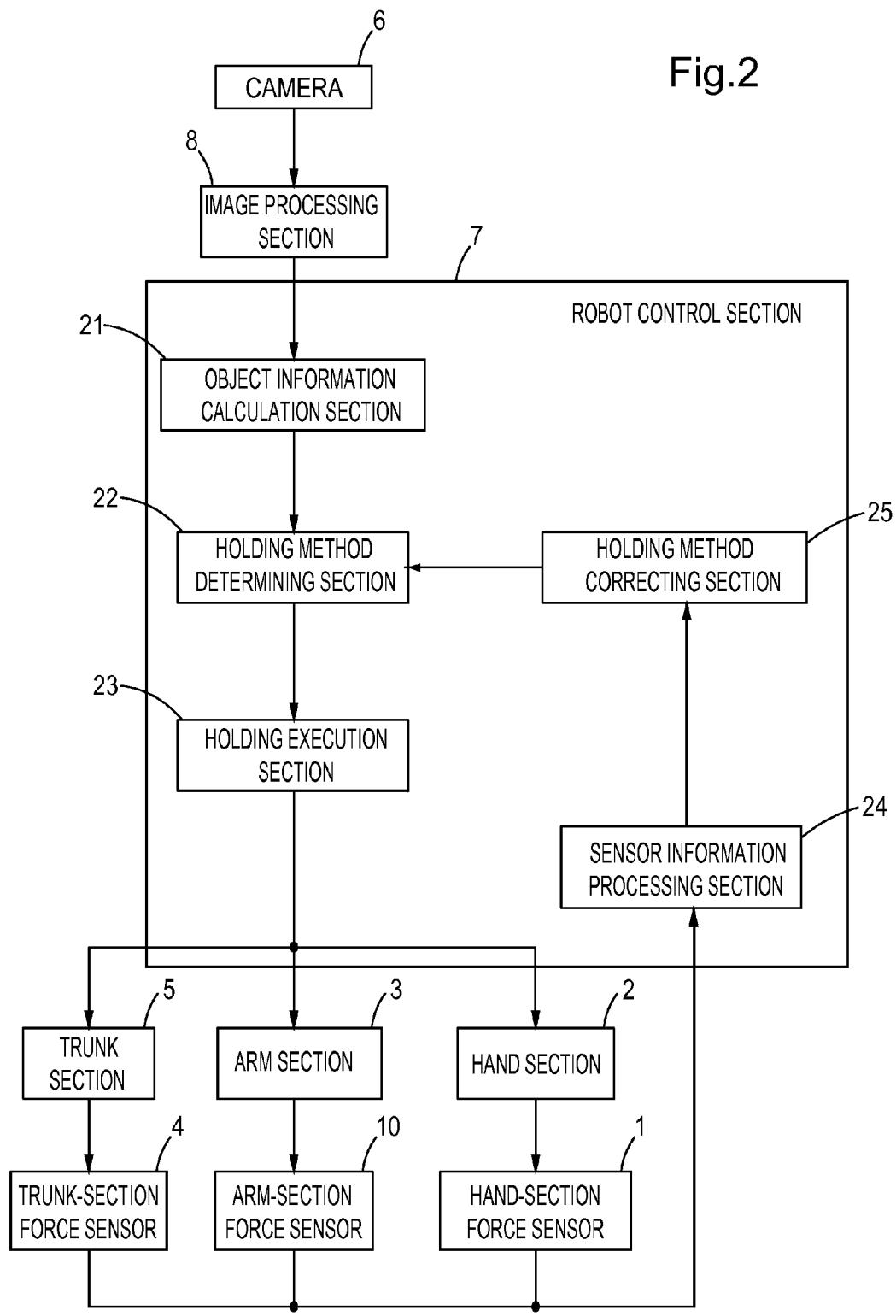

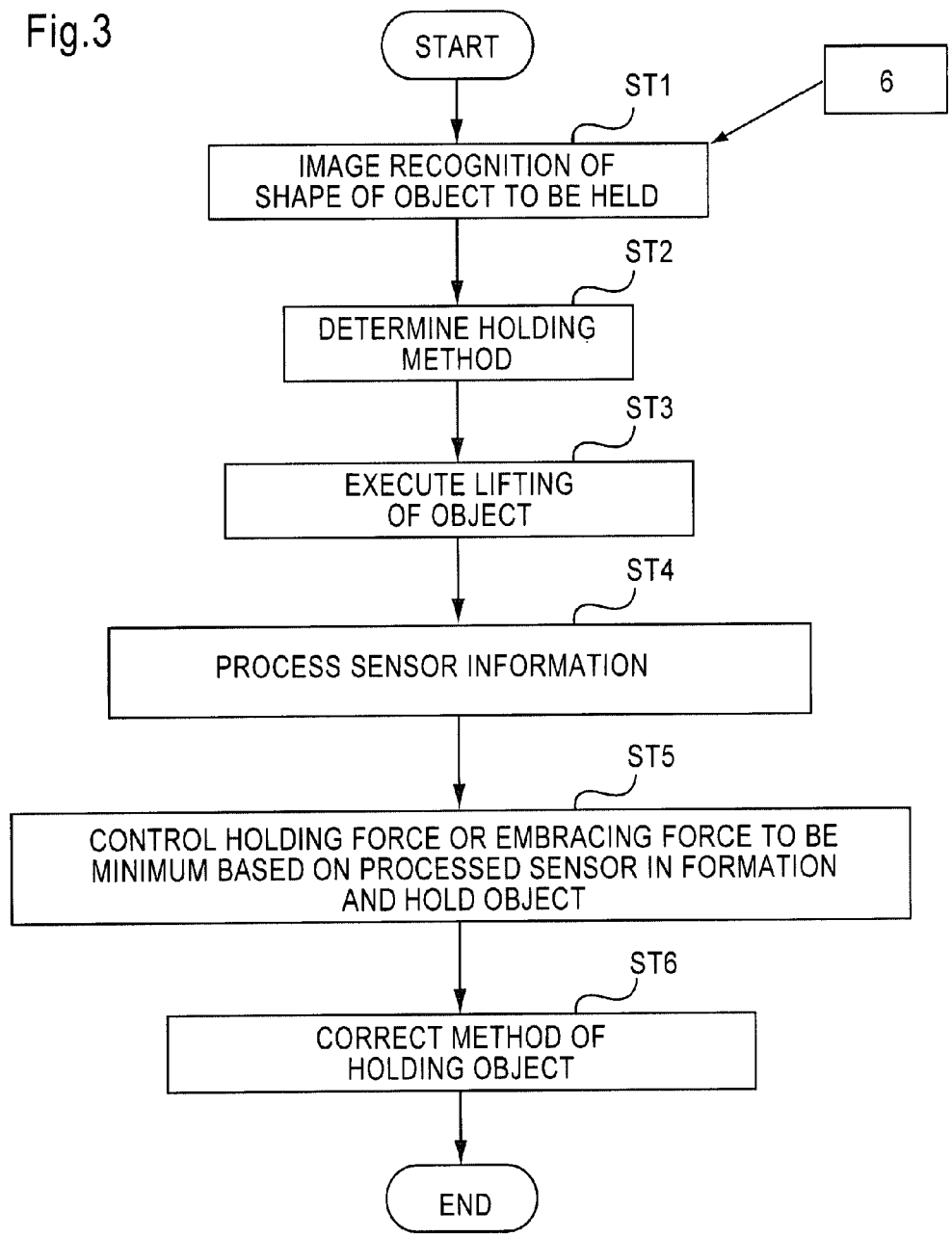

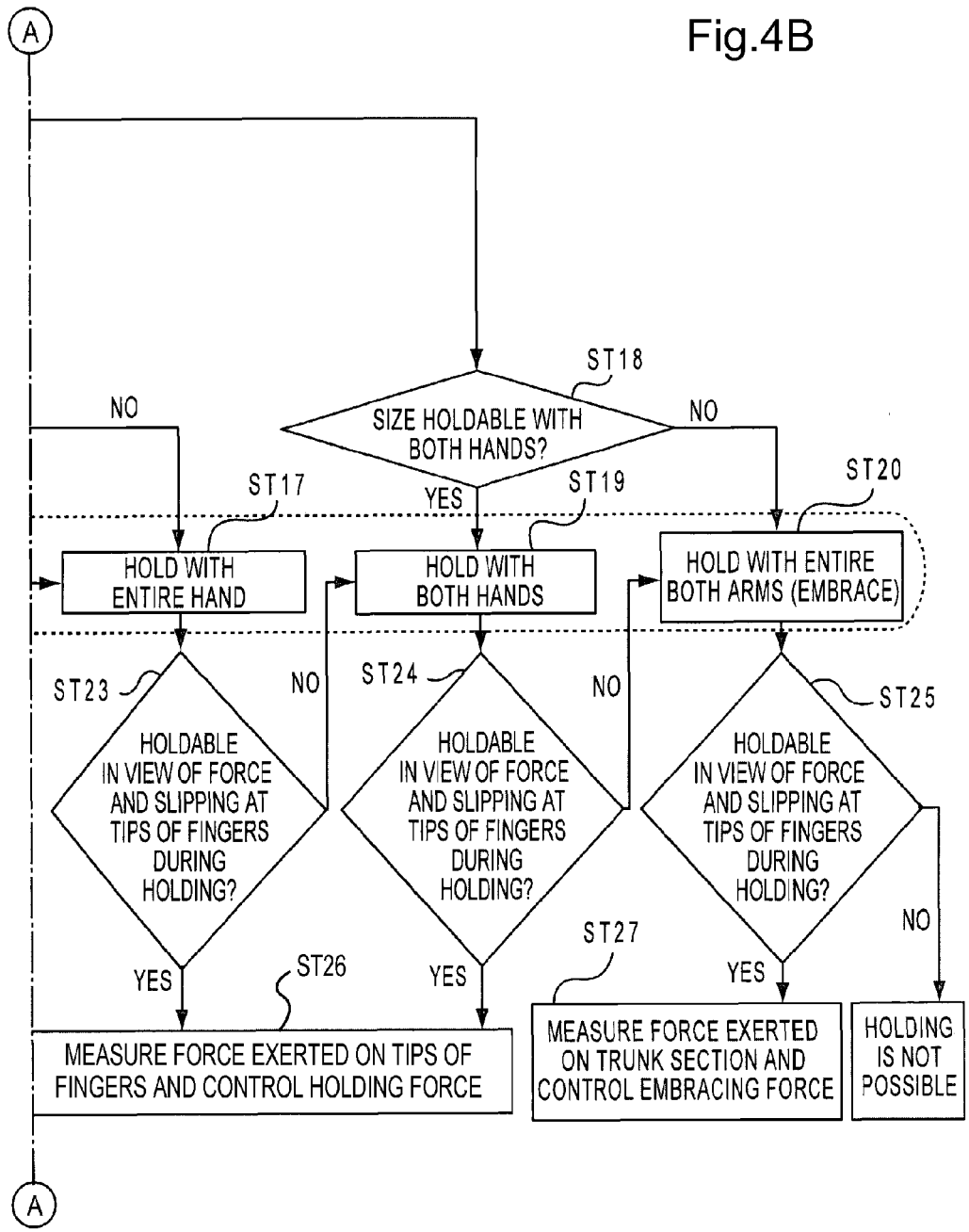

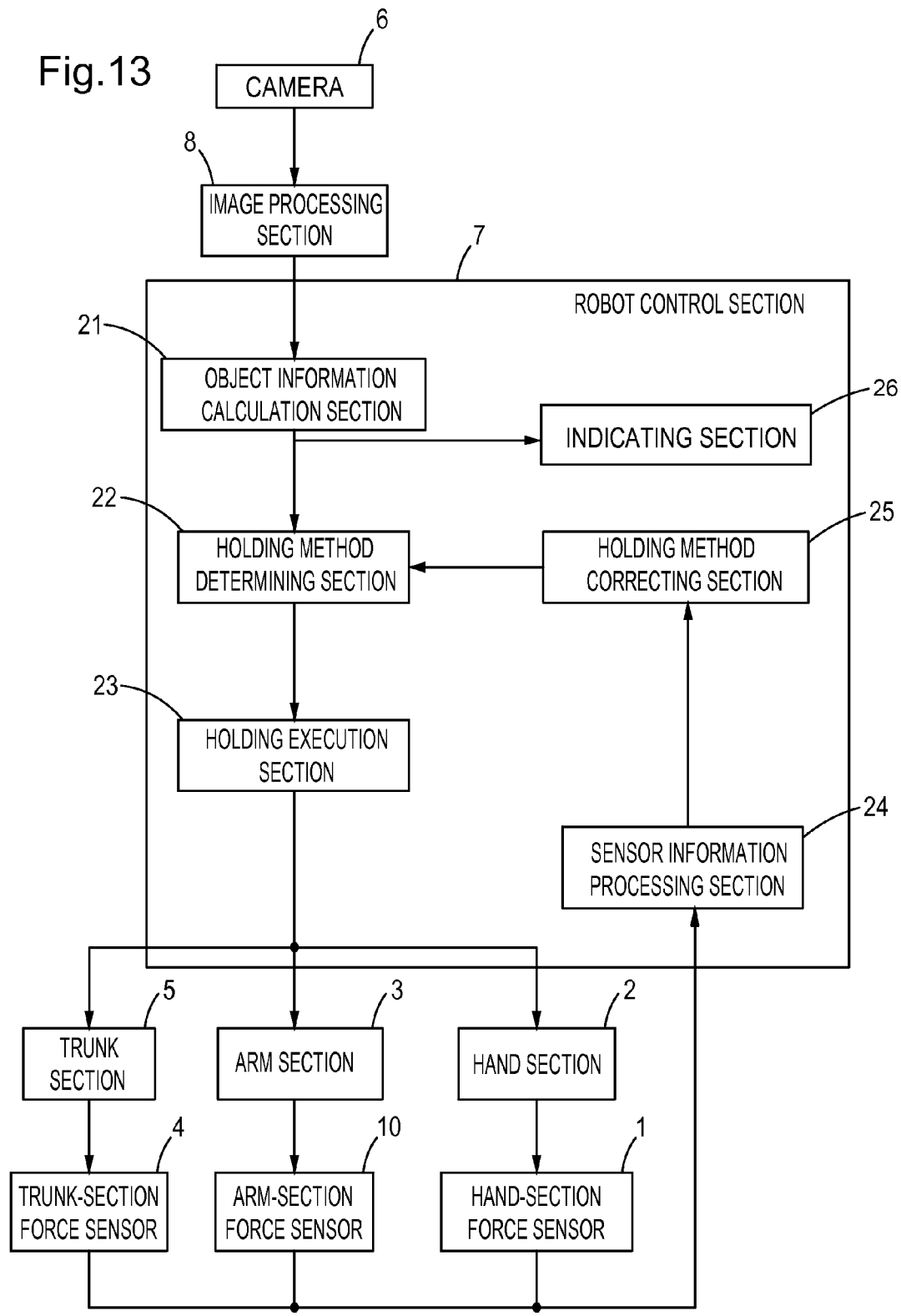

ROBOT SYSTEM

TECHNICAL FIELD

The present invention relates to a robot system having a robot arm with a robot hand attached thereto. More specifically, the present invention relates to a robot system that executes holding based on an image and sensor information.

BACKGROUND ART

In existing robot systems, an apparatus is configured so that a hand driving output signal is corrected using a touch sensor, a position sensor, a force sensor, or a deviation sensor of a hand section. Whether or not an object is held is determined based on outputs of the individual sensors, thereby achieving reliable holding (e.g., refer to Patent Document 1).

Furthermore, in order to recognize the position of an object to be held, the posture and position of a hand at the time of holding the object is simulated using image information from a plurality of cameras, the relative relationship between the object to be held and the hand is evaluated based on certain indices, and an optimum posture and position of the hand is selected based on the results of evaluation of all the relationships (e.g., refer to Patent Document 2).

FIG. 19 is an overall configuration diagram of a robot that uses the holding method according to Patent Document 1 describing the existing art.

Referring to FIG. 19, 101 denotes a robot hand, 102 denotes a sensor signal processing section, 103 denotes a control calculator, 104 denotes a driving section, 105 denotes a force sensor, 106 denotes a position sensor, 107 denotes a touch sensor, and 108 denotes a deviation sensor.

Now, the overall configuration of the robot that uses the holding method according to Patent Document 1 will be described with reference to FIG. 19.

The sensor signal processing section 102 converts signals from the four types of sensors provided on the robot hand 101, i.e., the force sensor 105, the position sensor 106, the touch sensor 107, and the deviation sensor 108, into signals that can be processed by the control calculator 103, and sends the signals to the control calculator 103. Upon receiving the signals regarding the status of holding an object from the sensor signal processing section 102, the control calculator 103 corrects signals for controlling movement regarding holding of the object by the robot hand 101. The driving section 104 converts the control signals from the control calculator 103 into power with which the robot hand 101 can be driven, and sends the power to the driving section 104 of the robot hand 101, i.e., to the driving mechanism and motor. Furthermore, the driving section 104 supplies electric power to the four types of sensors, i.e., the force sensor 105, the position sensor 106, the touch sensor 107, and the deviation sensor 108. At least two force sensors 105 are provided, which measure reaction forces received from a held object at the time of holding. The position sensor 106 measures the holding space of the object held. At least two touch sensors 107 are provided, which determine the status of touching with the object to be held. The deviation sensor 108 detects a deviation of the object to be held.

FIG. 20 is a control block diagram of the robot system according to Patent Document 1 describing existing art.

In FIG. 20, 109 denotes target deformation ratio setting, 110 denotes reaction force target value setting, 111 denotes deformation ratio determination, 112 denotes reaction force determination, A denotes reaction force target value, B denotes target deformation ratio, C denotes status of touching, D denotes hand position, and E denotes reaction force. Reference numerals that are the same as those in FIG. 19 denote the same components as those in FIG. 19, and description thereof will be omitted.

Now, an operation of the robot system according to Patent Document 1 will be described with reference to FIG. 20.

By feedback of signals from the sensor signal processing section 102 to the control calculator 103, it is determined whether holding has been executed properly. If a deviation of the object to be held is detected by the touch sensor 107 or the deviation sensor 108, the target deformation ratio setting 109 and the reaction force target value setting are performed again, and position control and force control are executed again.

FIG. 21 is a flowchart for explaining an operation of the robot system according to Patent Document 2 describing existing art.

First, terms used in the flowchart in FIG. 21 will be described.

A "sum S" is obtained by finding, regarding edges in a model of a robot hand in a case where models of a robot and individual components are projected onto a camera screen, portions that are viewable without being hidden by individual surfaces in the model of parts other than the robot hand and models of the individual components of the robot, converting the lengths of the portions into lengths in a three-dimensional space, and summing up values of the converted lengths.

An "evaluation value P" can be expressed as $P=S/M$, where M is a sum obtained by converting the lengths of all the edges in the model of the robot hand into lengths in a three dimensional space and summing up the values of the converted lengths.

Next, individual steps in a procedure of processing by the robot system described in Patent Document 2 describing existing art will be described in detail with reference to FIG. 21.

In step ST100, based on an image captured by a camera, a case where a robot and individual components are projected onto a screen is simulated. Next, in step ST200, the sum S is calculated and the evaluation value P is obtained. Then, in step ST300, it is checked whether step ST200 has been executed for all the holding positions and/or postures. In step ST400, the evaluation values P of the individual holding positions and/or postures are compared. Then, in step ST500, a holding position and/or posture with a maximum value of the evaluation value P is selected.

As described above, in robot systems according to existing arts, an object is held using information of either a sensor or a camera.

Patent Document 1: Japanese Unexamined Utility Model Application Publication No. 5-31887 (page 2 and FIGS. 1 and 3)

Patent Document 2: Japanese Unexamined Patent Application Publication No. 5-150835 (pages 2 to 4 and FIG. 1)

DISCLOSURE OF INVENTION

Problems to be Solved by the Invention

However, in the robot system according to the existing art in Patent Document 1, since image information is not used, a position instruction of a robot arm is not determined if an object to be held is not at a predetermined position, so that it is not possible to hold the object.

In the robot system according to the existing art in Patent Document 2, since a holding position and so forth is determined using only image information, it is not possible to recognize the mass of the object to be held. Thus, control for an optimum holding force or determination of an optimum holding method with both arms is not performed, so that there has been problems regarding the stability of an object held and regarding safety.

The present invention has been made in view of the problems described above, and it is an object thereof to provide a robot system that can hold an object safely, stably, and quickly by an optimum holding method and holding force.

Means for Solving the Problems

In order to solve the problems described above, according to a first aspect of the invention, a robot system includes a hand section having a finger with a hand-section force sensor provided at a distal end thereof; one or more arm sections having the hand section at a distal end thereof; a trunk section having the arm sections and on which a trunk-section force sensor is provided; a camera for measuring a shape of an object; a robot control section for controlling movement of the arm sections; and an image processing section for processing an image acquired by the camera; and the robot control section includes an object information calculating section for calculating, based on image information from the image processing section, a size and shape of the object to be held; a holding method determining section for determining, based on the object information calculated, a method for holding the object; a holding execution section for executing lifting of the object by the holding method determined; a sensor information processing section for processing pieces of sensor information and controlling holding force, the pieces of sensor information being those obtained at a time of the execution, and the processing of the pieces of sensor information being made for each combination of one or more of the pieces of information; and a holding method correction section for correcting, based on a result of the sensor information processing, the method for holding the object.

Furthermore, according to a second aspect of the invention, there is provided a storage section for storing inherent attribute information regarding the object as object data when the object is held, and maintaining the object data.

Furthermore, according to a third aspect of the invention, wherein the object data stored in the storage section when the object is held is one or more pieces of data regarding the object, such as a size, shape, mass, or shade of the object, and data regarding a holding method.

Furthermore, according to a fourth aspect of the invention, the arm section includes an arm-section force sensor for measuring a load on the arm section, and the robot control section controls holding force by using the arm-section force sensor in combination with the trunk-section force sensor.

Furthermore, according to a fifth aspect of the invention, the holding method determining section calculates a holding position of the object to he held and determines a holding method based on the object information calculated by the object information calculation section.

Furthermore, according to a sixth aspect of the invention, there is provided a moving mechanism for moving, based on the size and shape of the object, obtained from the image of the camera, the object to be held to a position where it is easy to hold the object.

Furthermore, according to a seventh aspect of the invention, the robot control section includes an indicating section for determining, based on the object information, whether it is possible to hold the object, and for indicating that holding is not possible when it is determined that holding is not possible.

According to an eighth aspect of the invention, the object information calculation section includes an ID tag reading section for recognizing the object to be held from an ID tag provided on the object.

Furthermore, according to a ninth aspect of the invention, the method for holding the object, executed by the holding execution section, is holding with three fingers of one hand, holding with five fingers of one hand, or holding with entire one hand in a case where the number of the arm sections provided, having the hand section with five fingers, is one, and holding with three fingers of one hand, holding with five fingers of one hand, holding with entire one hand, holding with entire both hands, or holding with entire both arms in a case where the number of the arm sections provided, having the hand section with five fingers, is two.

Furthermore, according to a tenth aspect of the invention, the robot control section includes an object movement processing section for selecting a part of the robot used for movement, that is, the hand section, the arm section, or a moving mechanism for moving a main unit of the robot in a case where the moving mechanism is provided, in accordance with an amount of movement of the object when the object is held and moved.

According to an eleventh aspect of the invention, the robot control section includes an amount-of-movement distributing section for distributing, based on remaining amounts to movable limits of individual joints of the hand section or the arm section, amounts of movement of the individual parts of the robot used to move the object when the object is held and moved.

Advantages

According to the first aspect of the invention, the size and shape of an object to be held is recognized from image information, holding is executed using a method determined, and the holding method is corrected using information of individual sensors. Thus, it is possible to prevent an occurrence of an excessive holding force, so that the risk of crushing or dropping the object is alleviated. Accordingly, it is possible to hold an object stably by an optimum holding method and holding force.

Furthermore, according to the second aspect of the invention, inherent attribute information regarding an object is stored as object data when the object is held, and the object data is maintained. Thus, it is possible to skip processing for determining a holding method at the next occasion of holding. This serves to increase the speed of processing for the proposed holding method.

Furthermore, according to the third aspect of, one or more pieces of data regarding the object, such as a size, shape, mass, or shade of the object, and data regarding a holding method are stored as object data when the object is held, and the object data is maintained. Thus, it is possible to skip processing for determining a holding method at the next occasion of holding. This serves to increase the speed of processing for proposing a holding method.

Furthermore, according to the fourth aspect of the invention, a force sensor for measuring a load on the trunk section and an arm-section force sensor for measuring a load on the arm section are provided. Thus, when the object is held by embracing, it is possible to control embracing force by measuring the force on the trunk section and the load on the arm section. Accordingly, it is possible to hold the object more safely and stably by an optimum holding force.

Furthermore, according to the fifth aspect of the invention, it is possible to avoid holding the object at an unreasonable posture or position. Thus, it is possible to hold the object more stably and safely.

Furthermore, according to the sixth aspect of the invention, since a moving mechanism is provided, it is possible to prevent interference between the object and the hand section when the hand section is moved to a holding position.

Furthermore, according to the seventh aspect of the invention, if it is clearly not possible to hold an object, an attempt to hold the object is refrained, and it is indicated that holding is not possible. This serves to avoid danger.

Furthermore, according to the eighth aspect of the invention, an object to be held is recognized from an ID tag provided on the object. Thus, it is possible to recognize the object quickly.

Furthermore, according to the ninth aspect of the invention, it is possible to hold the object more safely and stably by an optimum holding method.

Furthermore, according to the tenth aspect of the invention set, it is possible to move the object more safely and stably by an optimum method for moving the object.

Furthermore, according to the eleventh aspect of the invention, it is possible to move the object safely and stably by an optimum method for moving the object while avoiding unreasonable posture of the robot.

BRIEF DESCRIPTION OF DRAWINGS

FIG. 2 is a configuration diagram of a robot control section in a robot system according to the present invention.

FIG. 3 is a flowchart for explaining an operation of a robot system according to a first embodiment of the present invention.

FIG. 13 is a configuration diagram of a robot control section in a robot system according to a fourth embodiment of the present invention.

Figure 1:
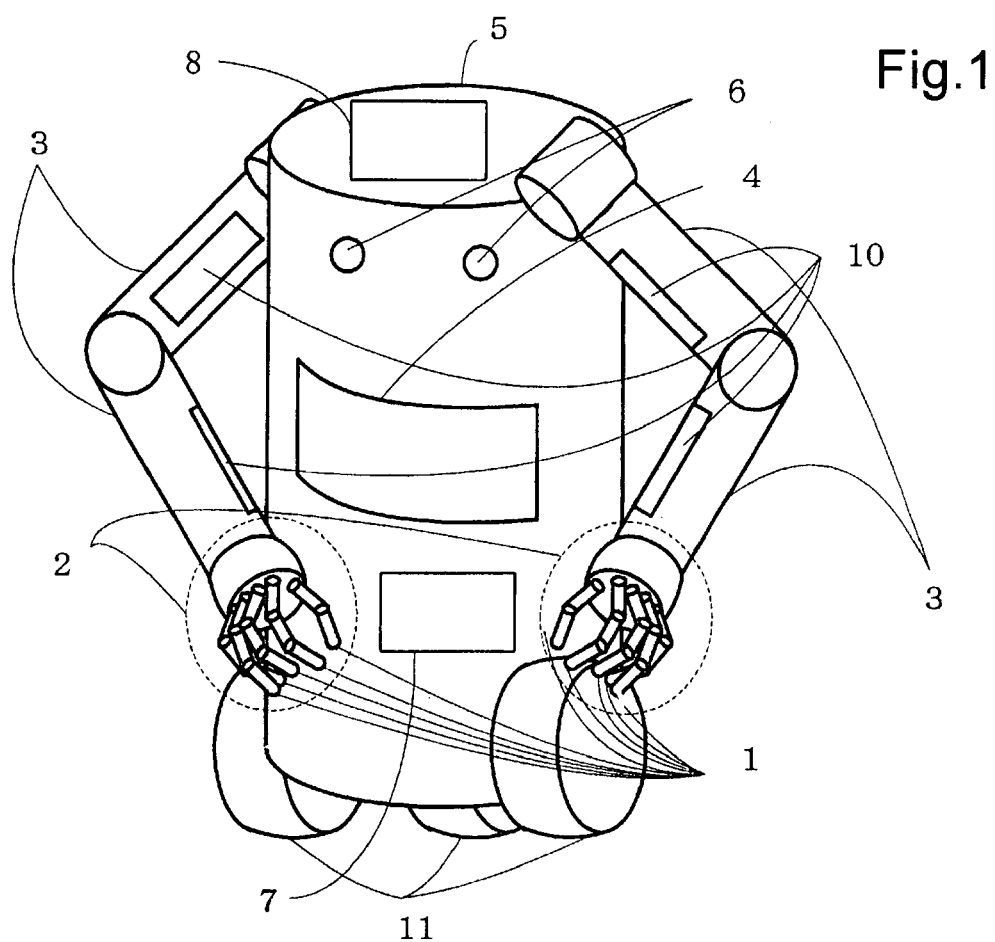
FIG. 1 is an overall configuration diagram showing the configuration of a robot according to an embodiment of the present invention.

REFERENCE NUMERALS 1 hand-section force sensor
2 hand section
3 arm section
4 trunk-section force sensor
5 trunk section
6 camera
7 robot control section
8 image processing section
9 storage section
10 arm-section force sensor
11 moving mechanism
12 object to be held
21 object information calculation section
22 holding method determining section
23 holding execution section
24 sensor information processing section
25 holding method correcting section
26 indicating section
27 object movement processing section
28 amount-of-movement distributing section
101 robot hand
102 sensor signal processing section
103 control calculator
104 driving section
105 force sensor
106 position sensor
107 touch sensor
108 deviation sensor
109 target deformation ratio setting
110 reaction-force target value setting
111 deformation ratio determination
112 reaction-force determination

BEST MODE FOR CARRYING OUT THE INVENTION

Now, a specific embodiment of the present invention will be described with reference to the drawings.

First Embodiment

FIG. 1 is a overall configuration diagram showing the configuration of a robot according to an embodiment of the present invention.

Referring to FIG. 1, 1 denotes a hand section force sensor, 2 denotes a hand section, 3 denotes an arm section, denotes a trunk-section force sensor, 5 denotes a trunk section, 6 denotes a camera, 7 denotes a robot control section, 8 denotes an image processing section, 10 denotes an arm-section force sensor, and 11 denotes a moving mechanism.

Now, the overall configuration of the robot according to this embodiment will be described with reference to FIG. 1.

The trunk section 5 of the robot has two arm sections 3, and a trunk-section force sensor 4 that measures the load on the trunk section 5. Each of the arm sections 3 has a hand section 2 at the distal end thereof. The hand section 2 has five fingers having a hand-section force sensor 1 at the distal end thereof. Two cameras 6 provided on the trunk section 5 of the robot measure the shape of an object to be held. The robot control section 7 controls the movement of the arm sections 3. The image processing section 8 of the robot processes images acquired by the cameras 6. The moving mechanism 11 moves the position of the robot.

The trunk-section force sensor 4 may be a sensor other than a force sensor as long as it is cable of measuring the load on the body in a wide range. Furthermore, a sensor that measures the load on a unit other than the trunk section 5, for example, the arm sections 3, such as an arm-section force sensor 10, may be used in combination.

FIG. 2 is a configuration diagram of a robot control section in a robot system according to the present invention.

Referring to FIG. 2, 21 denotes an object information calculation section, 22 denotes a holding method determining section, 23 denotes a holding execution section, 24 denotes a sensor information processing section, and 25 denotes a holding method correction section. In FIG. 2, reference numerals that are the same as those in FIG. 1 denote the same components as in FIG. 1, and description thereof will be omitted.

Now, the configuration of the robot control section 7 in the robot system according to the present invention will be described with reference to FIG. 2.

Images acquired by the cameras 6 are processed in the image processing section 8, and the object information calculating section 21 calculates the size and shape of an object based on image information from the image processing section 8. The holding method determining section 22 determines a method for holding the object based on object information from the object information calculating section 21. The holding execution section 23 controls the arm sections 3 according to the holding method from the holding method determining section 22 to lift the object. The sensor information processing section 24 processes a combination of one or more items of sensor information during execution of holding to control the holding force. The holding method correction section 25 corrects the holding method based on the result of the sensor information processing, and corrects the method for holding the object.

FIG. 3 is a flowchart showing an operation of a robot system according to a first embodiment of the present invention.

Now, first, an overview of the operation of the robot system according to the present invention will be described with reference to FIG. 3.

First, in step ST1, the object information calculating section 21 calculates the size and shape of an object based on images acquired by the cameras 6.

Then, in step ST2, the holding method determining section 22 tentatively proposes a holding method in accordance with the calculated size of the object.

Then, in step ST3, the holding execution section 23 actually holds the object according to the determined holding method to execute lifting of the object.

Then, in step ST4, the sensor information processing section 24 collects force and slipping, i.e., information for determining that it is not possible to hold the object according to the holding method determined based on information from force sensors, because of slipping, instability, or the like.

Then, in step ST5, based on the information obtained in step ST4, the sensor information processing section 24 measures the force exerted on the tip of the fingers when the object is to be held by fingers or hands to control the holding force, and measures the force exerted on the trunk section when the object is to be held by both arms and control the embracing force.

Finally, in step ST6, the holding method correction section 25 determines whether it is possible to hold the object by the holding method determined in step ST2 and the holding force controlled in step ST5. If it is determined that it is not possible to hold the object, the holding method correction section 25 corrects the holding method determined in step ST2, and steps ST2 to ST6 are repeated using the corrected holding method until it is determined that it is possible to hold the object. If it is determined that it is not possible to hold the object with the current configuration of the robot, holding is given up.

Figure 4A:
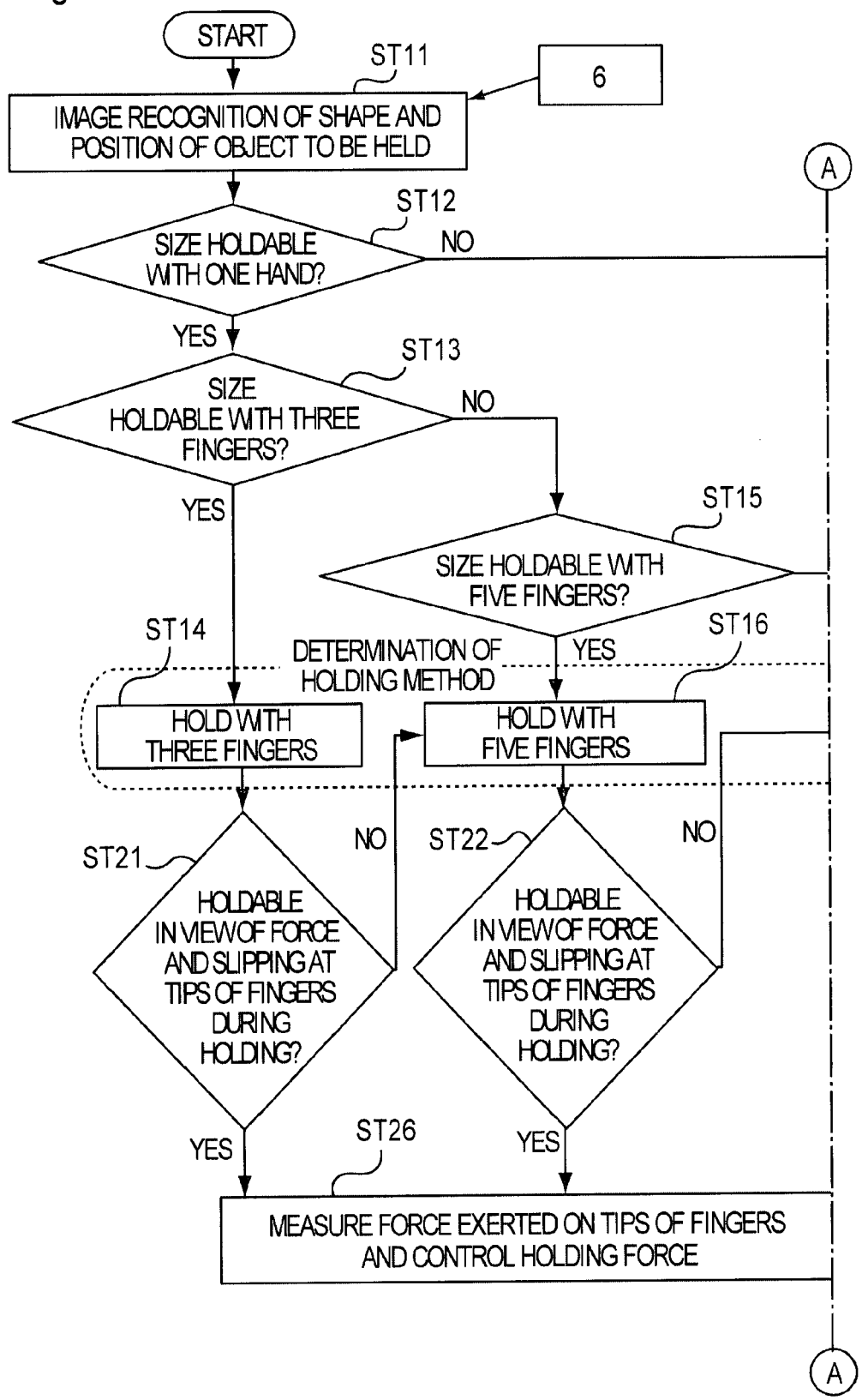
FIG. 4 is a flowchart for explaining a detailed operation of the robot system according to the first embodiment of the present invention.

FIG. 4 is a flowchart showing a detailed operation of the robot system according to the first embodiment of the present invention, which relates to the example of the robot having a hand section with five fingers and two robot arm sections, described earlier and shown in FIG. 1.

Figure 5:
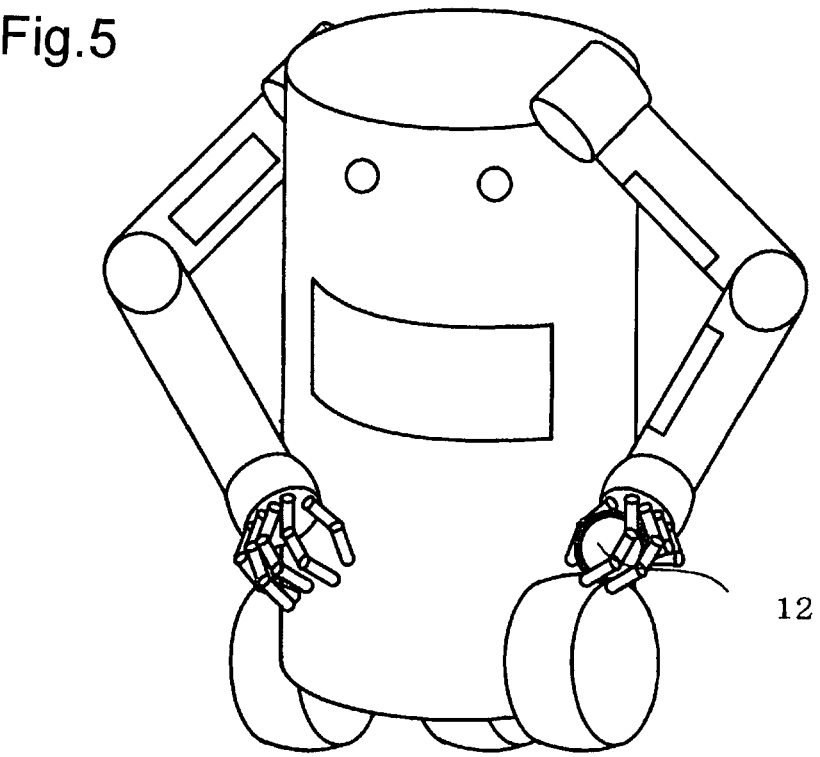
FIG. 5 is an explanatory diagram regarding holding with three fingers of one hand, which is a holding method in the robot system according to the present invention.
Figure 6:
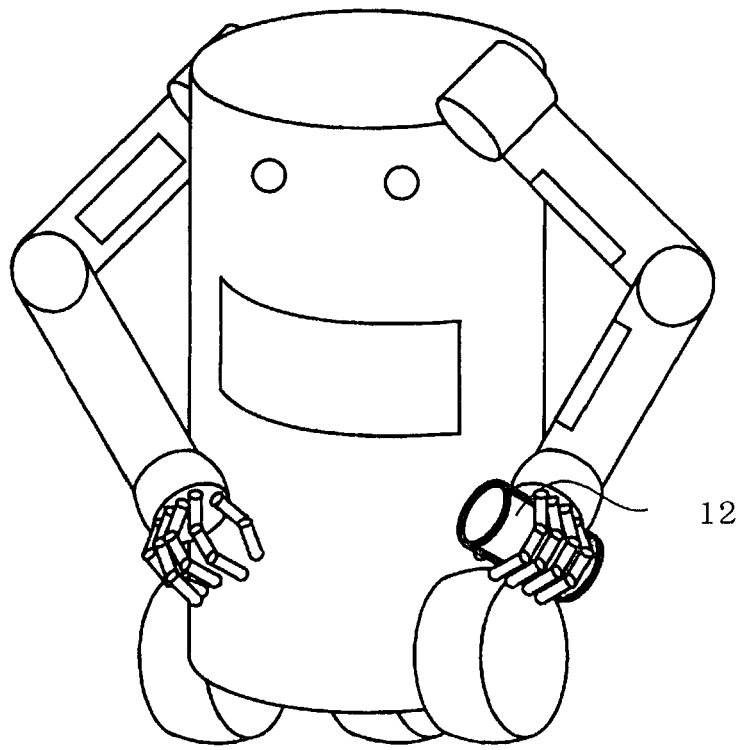
FIG. 6 is an explanatory diagram regarding holding with five fingers of one hand, which is a holding method in the robot system according to the present invention.
Figure 7:
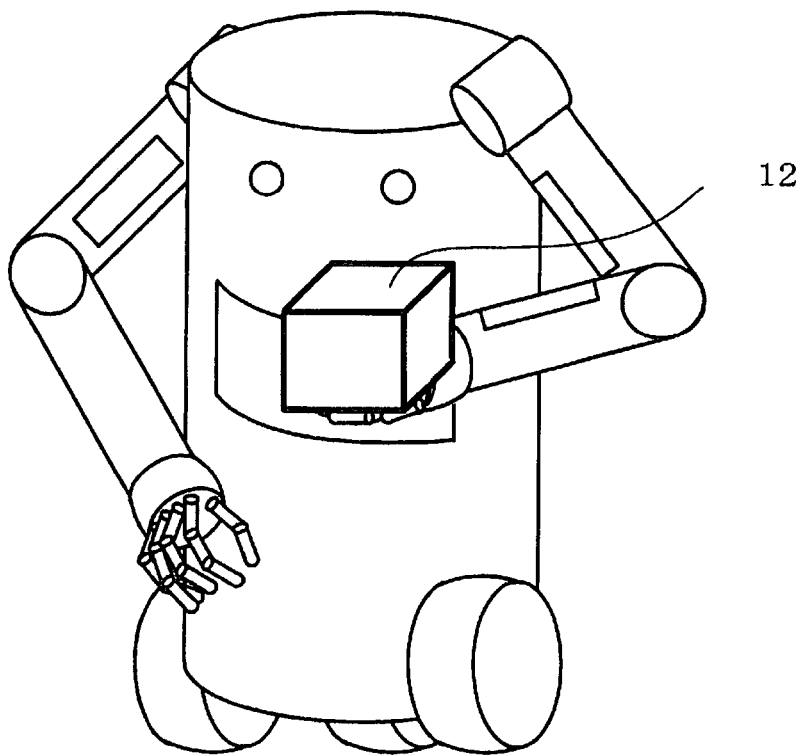
FIG. 7 is an explanatory diagram regarding holding with entire one hand, which is a holding method in the robot system according to the present invention.
Figure 8:
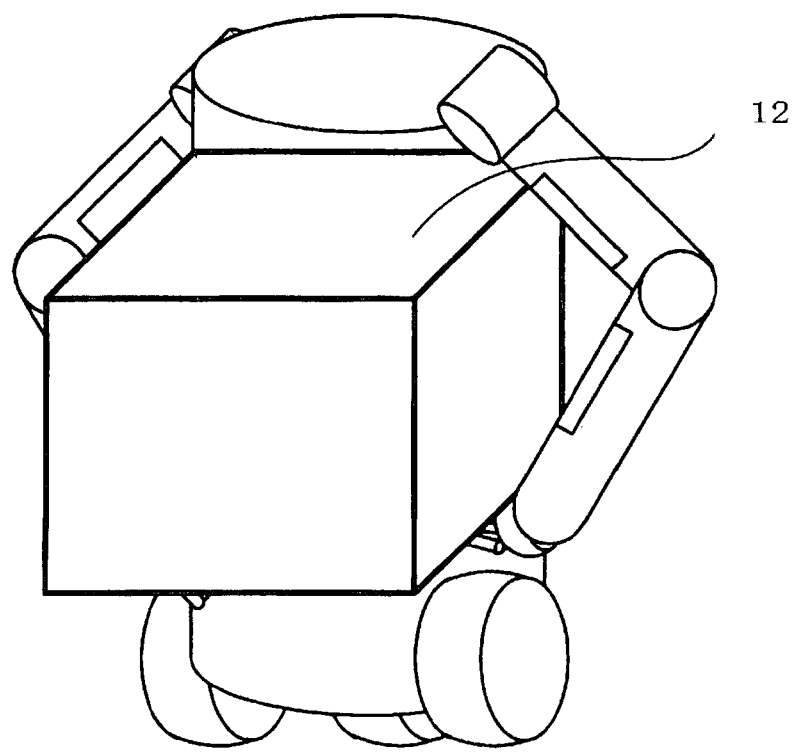
FIG. 8 is an explanatory diagram regarding holding with entire both hands, which is a holding method in the robot system according to the present invention.
Figure 9:
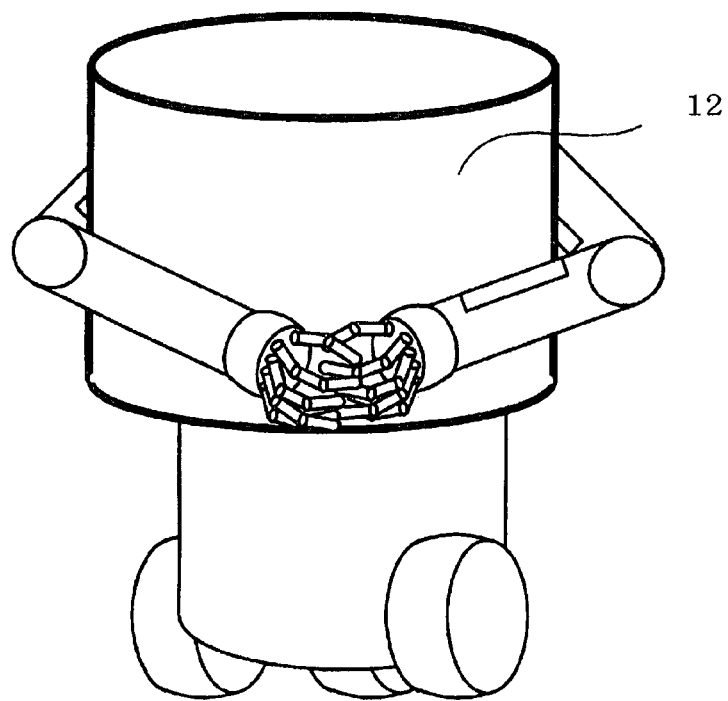
FIG. 9 is an explanatory diagram regarding holding with entire both arms, i.e., embracing, which is a holding method in the robot system according to the present invention.

Furthermore, FIG. 5 is a diagram regarding holding by three fingers of one hand, which is a holding method in the robot system according to the present invention. FIG. 6 is a diagram regarding holding by five fingers of one hand, which is a holding method in the robot system according to the present invention. FIG. 7 is an explanatory diagram regarding holding with entire one hand, which is a holding method in the robot system according to the present invention. FIG. 8 is a diagram regarding holding by the entire both hands, which is a holding method in the robot system according to the present invention. FIG. 9 is a diagram regarding holding by the entire both arms, i.e., embracing, which is a holding method in the robot system according to the present invention. In FIGS. 5, 6, 7, and 8, 12 is an object.

Hereinafter, with reference to FIGS. 4, 5, 6, 7, 8, and 9, a detailed flow of a holding operation in the robot system according to this embodiment, from recognition of the size and shape of an object to stable holding, will be described.

In step ST11, the object information calculating section 21 calculates the size and shape of the object based on image information acquired by the cameras 6.

In step ST12, the holding method determining section 22 determines whether it is possible to hold the object by one hand according to the dimensions and capabilities of arm sections and hand sections, based on the calculated size and shape of the object.

If it is determined in step ST12 that it is possible to hold the object by one hand, in step ST13, it is determined if it is possible to hold the object with three fingers as shown in FIG. 5. If it is determined in step ST13 that it is possible to hold the object with three fingers, in step ST14, "hold with three fingers" is selected as a determined holding method. If it is determined in step ST13 that it is not possible to hold the object with three fingers, in step ST15, it is determined based on the image information whether it is possible to hold the object with five fingers as shown in FIG. 6. If it is determined in step ST15 that it is possible to hold the object with five fingers, in step ST16, "hold with five fingers" is selected as a determined holding method. If it is determined in step ST15 that it is not possible to hold the object with five fingers, i.e., that it is necessary to hold the object with the entire one hand, in step ST17, "hold with the entire one hand" is selected as a determined holding method as shown in FIG. 7.

On the other hand, if it is determined in step ST12, described earlier, that it is not possible to hold the object with one hand, in step ST18, it is determined whether it is possible to hold the object with both hands as shown in FIG. 8. If it is determined in step ST18 that it is possible to hold the object with both hands, in step 19, "hold with both hands" is selected as a determined holding method. On the other hand, if it is determined in step ST18 that it is not possible to hold the object with both hands, i.e., that it is necessary to hold the object with the entire both arms, in step ST20, "hold with the entire both arms" shown in FIG. 9, i.e., embracing, is selected as a determined holding method.

The holding execution section 23 actually executes holding by the holding method determined by the holding method determining section 22 through the procedure of steps ST 11 to 20 described above. Based on reaction force and slipping of sensor units measured by individual sensors, the sensor information processing section 24 controls the holding force using sensor information regarding whether the determined holding method is valid, i.e., whether it is possible to hold the object. If it is determined that the holding force is weak, the holding method correction section 25 corrects the holding method to a holding method that is one level above. That is, if holding with three fingers has been tentatively proposed, in step ST21, a holding method with five fingers is proposed. If holding with five fingers has been tentatively proposed, in step ST22, holding with the entire one hand is proposed. If holding with the entire one hand has been tentatively proposed, in step ST23, holding with both hands is proposed. If holding with both hands has been tentatively proposed, in step ST24, the holding method is corrected to holding with both arms, i.e., embracing.

The correction through steps ST 21 to 24 is repeated until it is determined that it is possible to hold the object according to values measured by individual sensors, and holding is actually executed.

At this time, in the case of a holding method other than holding with both arms, i.e., embracing, in step ST26, the force exerted on the hand section force sensor 1 is measured, and the holding force is controlled to become a necessary minimum holding force. When the object is held with both arms, in step ST27, the force exerted on the trunk section is measured by the trunk section force sensor 4, and the holding force is controlled to become a necessary minimum holding force, i.e., embracing force. If it is not possible to hold the object even with both arms, in step ST25, it is determined that it is not possible to hold the object.

With the configuration and operation described above, in the robot system according to this embodiment, it is possible to prevent an occurrence of an excessive holding force. This alleviates the risk of crushing or dropping the object. Thus, it is possible to hold the object stably with an optimum holding method and holding force.

Second Embodiment

Figure 10:
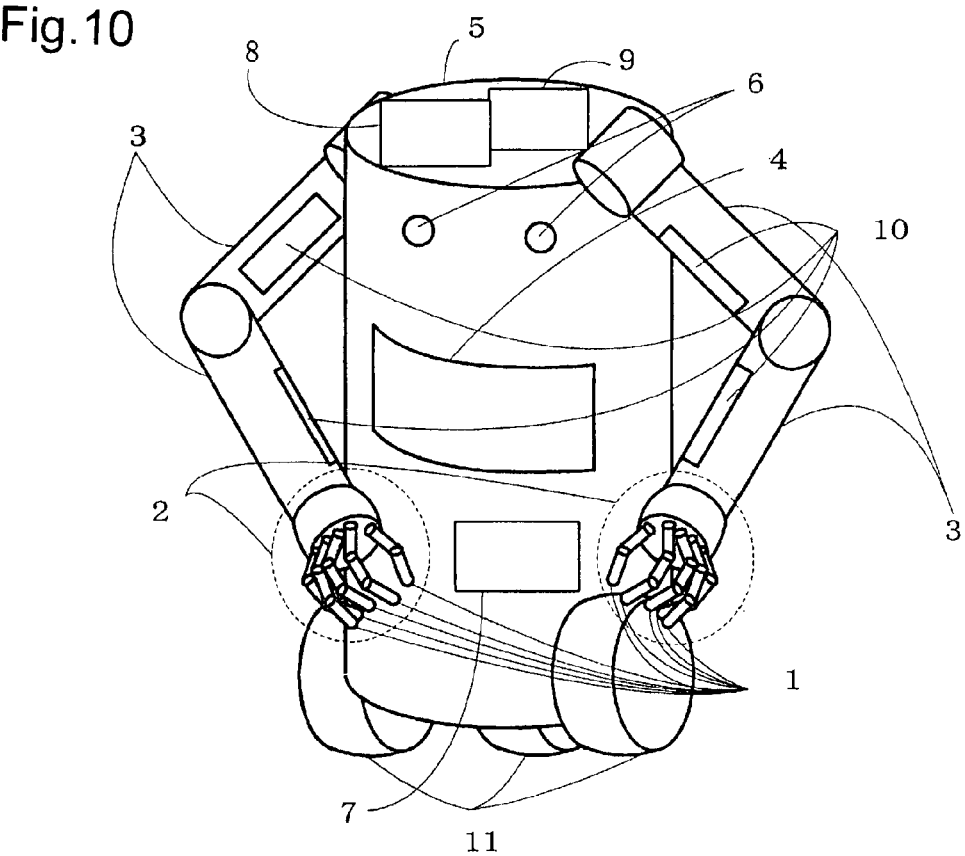
FIG. 10 is a configuration diagram of a robot system according to a second embodiment of the present invention.

FIG. 10 is a configuration diagram of a robot system according to a second embodiment of the present invention. Referring to FIG. 10, 9 denotes a storage unit. Reference numerals that are the same as those in FIG. 1 denote the same components as in FIG. 1, and description thereof will be omitted.

This embodiment differs from the first embodiment in that the robot system according to this embodiment includes a storage unit that stores and maintains, as object data, specific attribute information regarding the object when the object is held, i.e., one or more items of data regarding the object, such as the size, shape, mass, or intensity level of the object, and the holding method.

Figure 11A:
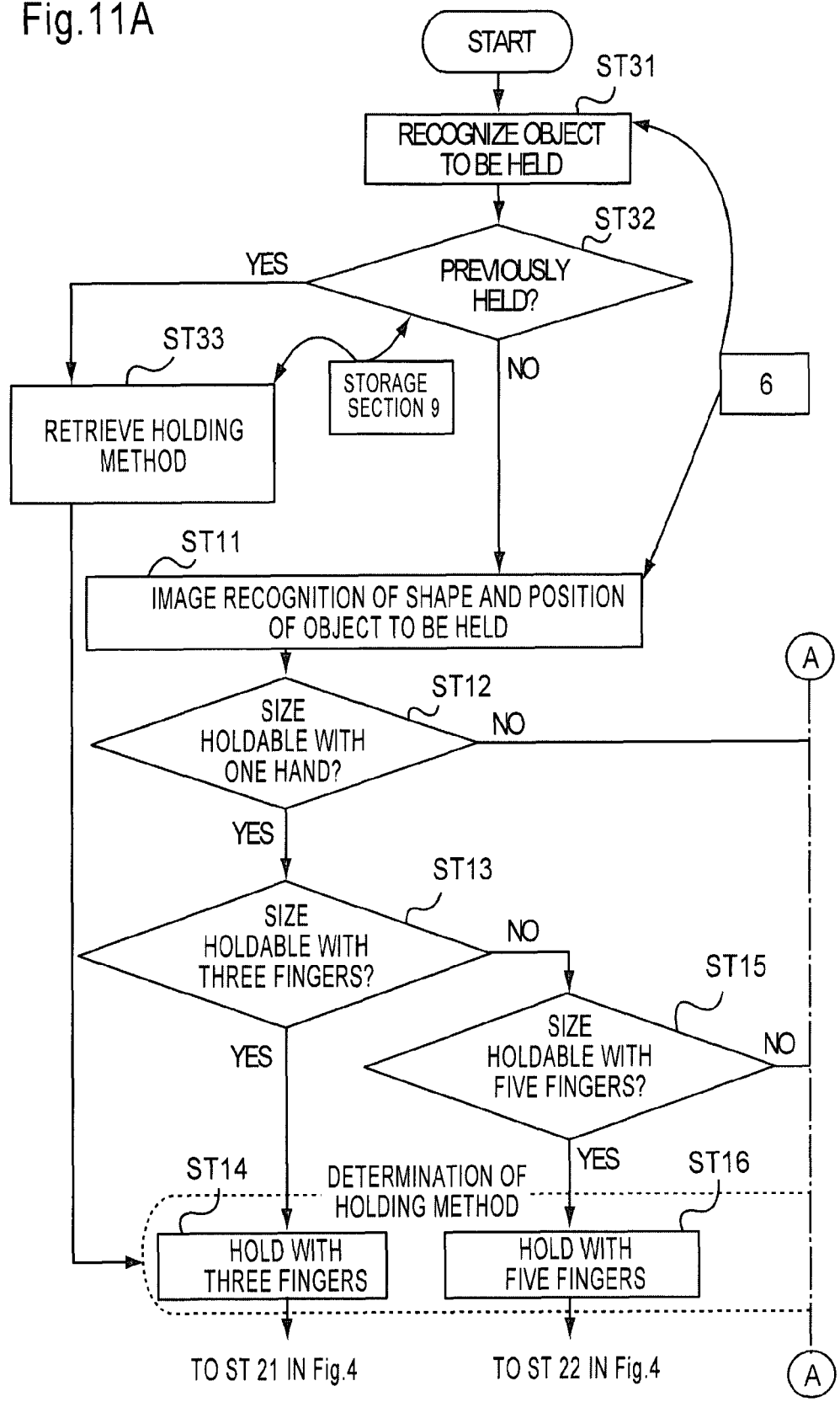
FIG. 11 is a flowchart for explaining an operation of the robot system according to the second embodiment of the present invention.
Figure 11B:
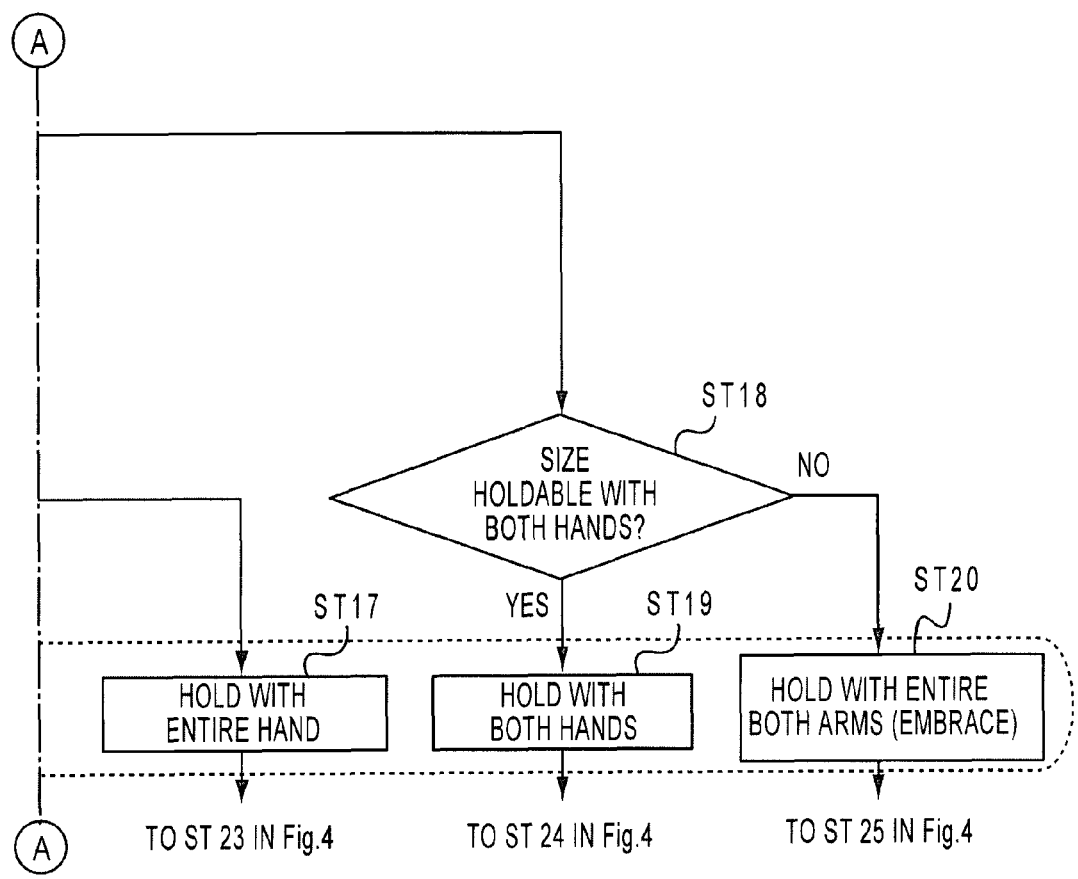

FIG. 11 is a flowchart showing an operation of the robot system according to the second embodiment of the present invention. The same step ST numbers as those in FIG. 4 denote the same processing steps as in FIG. 4. The operation of the robot system according to this embodiment differs from that in the first embodiment in that steps ST31 and 32 described below are provided before step ST11 in the first embodiment.

Now, the operation of the robot system according to this embodiment will be described with reference to FIG. 11.

First, in step ST31, when the robot has come close to an object to be held, the robot recognizes the object to be held.

Then, in step ST32, the object recognized in step ST31 is compared with object data needed to recognize the object, which is stored and maintained in the storage unit 9 at the time of holding, and it is determined whether the object has ever been held previously.

If it is determined as a result of the determination in step ST32 that the object has ever been held previously, steps ST11 to ST20 in the first embodiment are skipped, then in step ST33, data regarding holding is retrieved from the object data in the storage unit 9, and the retrieved holding method is determined. The subsequent procedure is the same as steps ST 21 to 27 in the first embodiment, so that description thereof will be omitted.

On the other hand, if it is determined as a result of the determination in step ST32 that the object to be held has never been held before, processing that is the same as that in the first embodiment, i.e., processing in steps ST 11 to 27 shown in FIG. 4, is executed.

As a method for recognizing the object to be held in step ST31, the cameras 6 provided on the robot may be used. Other means may be provided, for example, an ID-tag reading unit (not shown) may be provided in the object information calculating section 21 to recognize the object to be held from an ID tag provided on the object to be held. As long as it is possible to recognize an object to be held, the method is not limited to the above.

As described above, in the robot system according to this embodiment, information of a held object is stored and maintained in the storage unit 9 at the time of holding, and when an object that has been held before is held, the stored information is retrieved, and the procedure up to determination of a holding method after recognition of the shape of the object to be held is omitted. Thus, the time taken to hold the object can be reduced.

Third Embodiment

The configuration of the robot system according to this embodiment is the same as that in FIGS. 1 and 2 showing the first embodiment, so that description thereof will be omitted.

The robot system according to this embodiment differs from that in the first embodiment in that, in this embodiment, step ST41, which is an operation of determining a position of holding from the size and shape of an object to be held obtained based on images of the camera 6, is provided between steps ST11 and ST12 in the first embodiment.

Figure 12A:
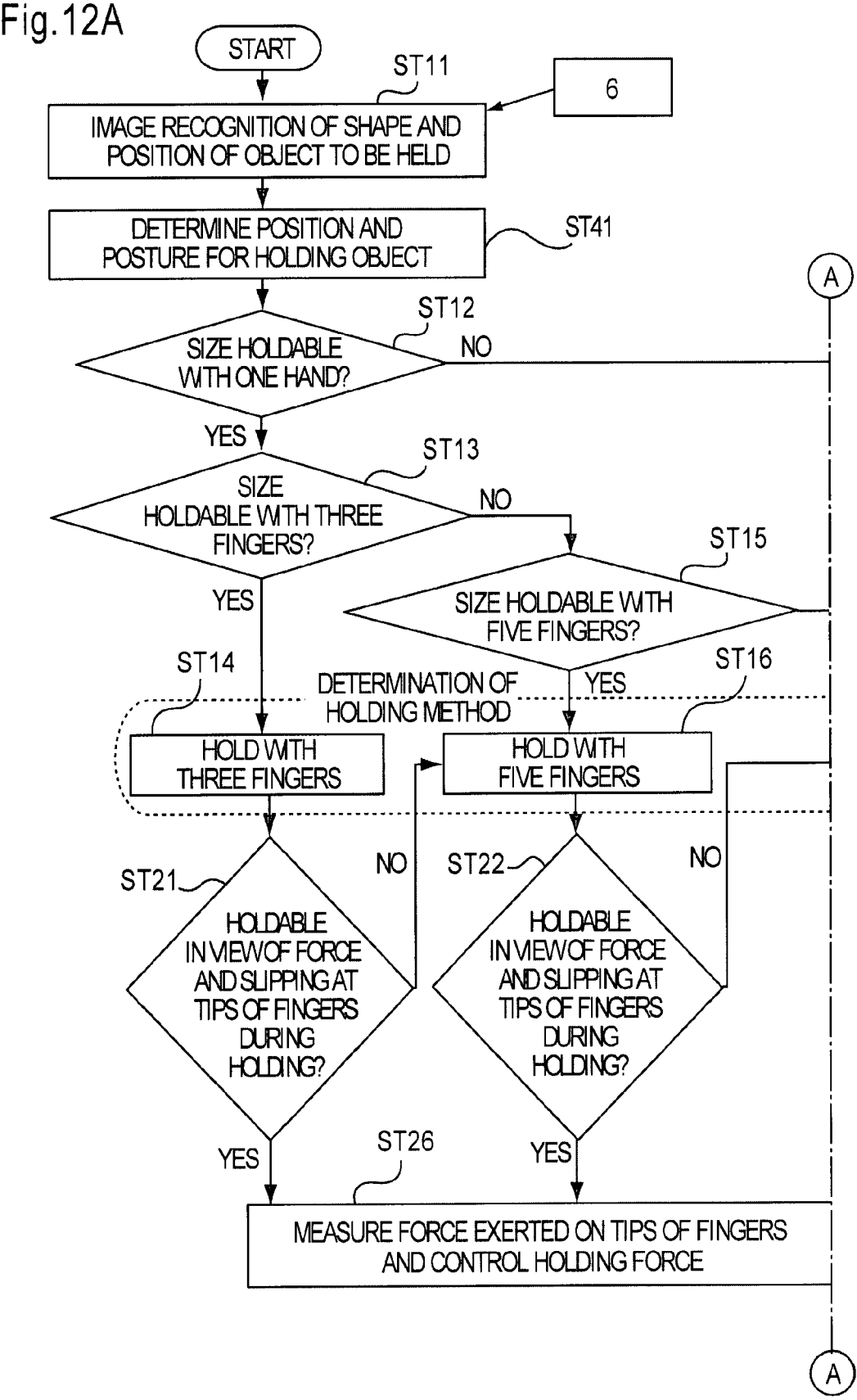
FIG. 12 is a flowchart for explaining an operation of a robot system according to a third embodiment of the present invention.
Figure 12B:
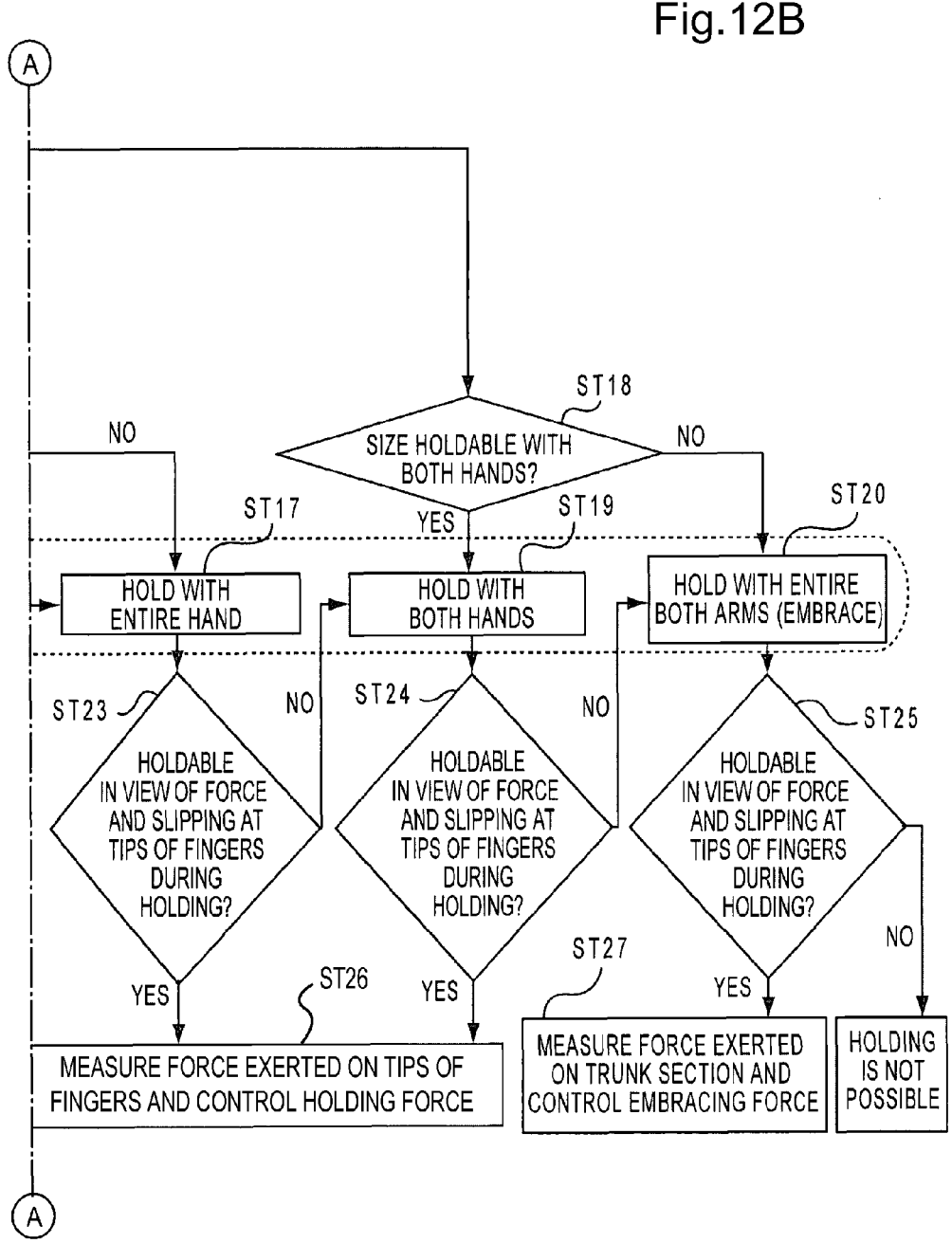

FIG. 12 is a flowchart for explaining an operation of the robot system according to a third embodiment of the present invention. Steps having the same step ST numbers as those in FIG. 4 showing the first embodiment denotes the same processing steps as those in FIG. 4.

Now, an operation of the robot system according to this embodiment will be described with reference to FIG. 12.

In step ST11, the size and shape of an object to be held is calculated based on images acquired by the cameras 6, and in step ST41, a holding position and posture determined as optimum are determined based on the size and shape. For example, if a grip exists, instead of holding the center of gravity of the object, the grip is held. The subsequent steps are the same as steps ST 12 to 27 in FIG. 4 showing the first embodiment, so that description thereof will be omitted.

As described above, in the robot system according to this embodiment, the position and posture at the time of holding an object is determined based on the size and object of the object to be held. Thus, it is possible to avoid holding the object at an unreasonable posture or position, so that it is possible to hold an object more stably with less holding force compared with holding the object arbitrarily.

Fourth Embodiment

FIG. 13 is a configuration diagram of a robot control section in a robot system according to a fourth embodiment of the present invention.

In FIG. 13, 26 denotes an indicating section. Reference numerals that are the same as those in FIGS. 1 and 2 showing the first embodiment denote components that are the same as those in FIGS. 1 and 2, and description thereof will be omitted.

A feature of this embodiment is as follows.

That is, the robot control section 7 in the robot system according to this embodiment includes the indicating section 26 for determining whether it is possible to hold an object based on object information, and for indicating that holding is not possible when it is determined that holding is not possible.

Figure 14:
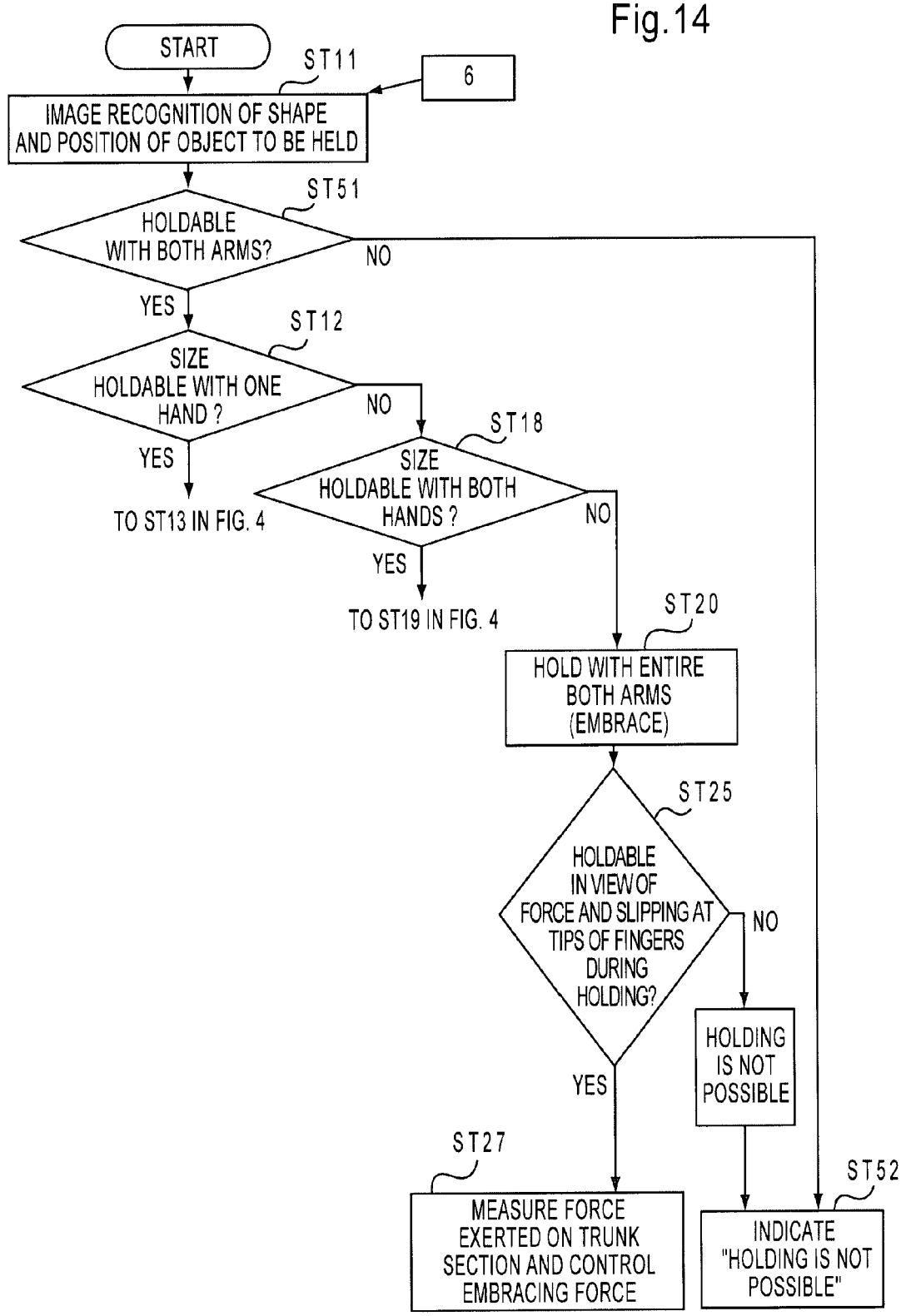
FIG. 14 is a flowchart for explaining an operation of the robot system according to the fourth embodiment of the present invention.

FIG. 14 is a flowchart for explaining an operation of the robot system according to the fourth embodiment of the present invention. Step ST numbers that are the same as those in FIG. 4 showing the first embodiment denote processing steps that are the same as those in FIG. 4.

Now, an operation of the robot system according to this embodiment will be described with reference to FIG. 14.

After calculating the size and shape of an object to be held based on images acquired by the cameras 6 in step 11, in step ST51, it is determined based on the size and shape of the object to be held whether it is possible to hold the object with both arms. If it is determined that holding is not possible even with both arms, determination of a holding method and execution of holding are refrained, i.e., processing operations in steps ST12 to ST27 are not executed, and it is indicated in step ST52 that holding is not possible.

The method of indication by the indicating section 26 is not limited as long as it is not dangerous, and may be the issuance of an alarm sound, an operation indicating that holding is not possible, or the like.

As described above, according to the robot system according to this embodiment, if it is determined that it is not possible to hold an object to be held, determination of a holding method and execution of holding are refrained. Thus, it is possible to reduce processing time from recognition of the object to be held to determination that holding is not possible. Furthermore, if it is clearly not possible to hold an object, instead of holding the object, it is indicated that holding is not possible. This serves to avoid danger.

Fifth Embodiment

The configuration of the robot system according to this embodiment is the same as that in FIGS. 1 and 2 showing the first embodiment, so that description thereof will be omitted.

This embodiment differs from the first embodiment in the following respect.

That is, in this embodiment, based on the size and shape of the object to be held, obtained from the images of the cameras 6, the robot is moved by the moving mechanism 11 to a position where it is easy to hold the object. That is, between steps ST11 and ST12 in the first embodiment, step ST60 of determining whether to move the position of the robot, and step ST61 of moving the position of the robot using the moving mechanism 11 are provided.

Figure 15:
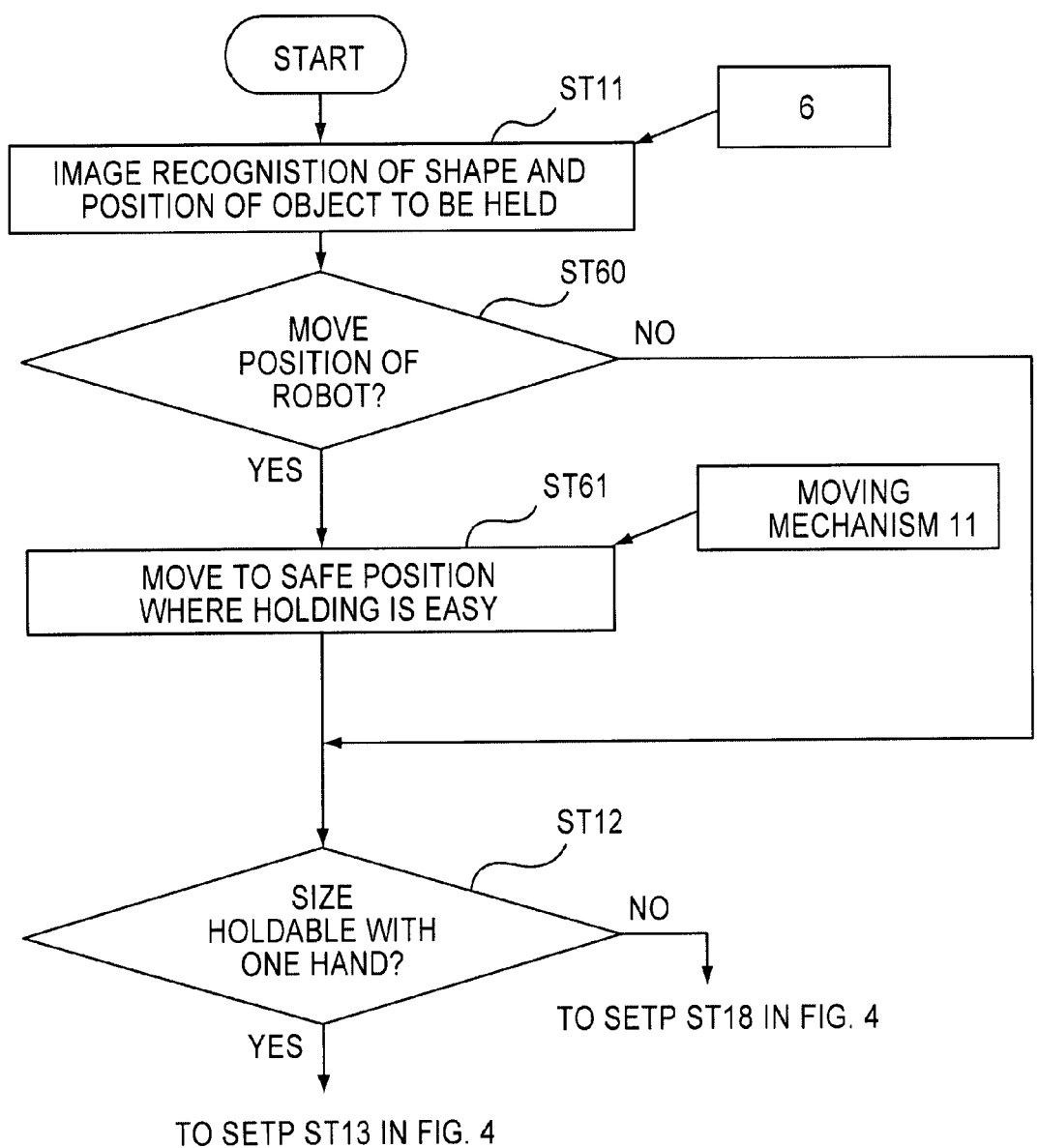
FIG. 15 is a flowchart for explaining an operation of a robot system according to a fifth embodiment of the present invention.

FIG. 15 is a flowchart for explaining an operation of the robot system according to the fifth embodiment of the present invention. Step ST numbers that are the same as those in FIG. 4 showing the first embodiment denote processing steps that are the same as those in FIG. 4.

Now, an operation of the robot system according to this embodiment will be described with reference to FIG. 15.

After calculating the size and shape of the object to be held based on images acquired by the cameras 6 in step ST11, in step ST60, based on the size and shape, it is determined whether it becomes possible to move the hand section 2 to a holding position readily and safely by moving the position of the robot. If it is determined that it becomes possible to move the hand section 2 readily and safely by moving the position of the robot, in step ST61, the position of the robot is moved using the moving mechanism 11. For example, in a case where a small object with a large specific gravity is to be held, it is safer to hold the object at a position close to the trunk section 5. Thus, after recognizing the object to be held, the robot is moved closer to the object by using the moving mechanism 11. The subsequent steps are the same as steps ST12 to ST27 in FIG. 4 showing the first embodiment, so that description thereof will be omitted.

As described above, in the robot system according to this embodiment, after recognizing the size and shape of an object to be held, the position of the robot is adjusted using the moving mechanism 11. Thus, it is possible to prevent interference between the hand section and the object when the hand section is moved to a holding position. Accordingly, it is possible to hold an object readily and safely.

Sixth Embodiment

Figure 16:
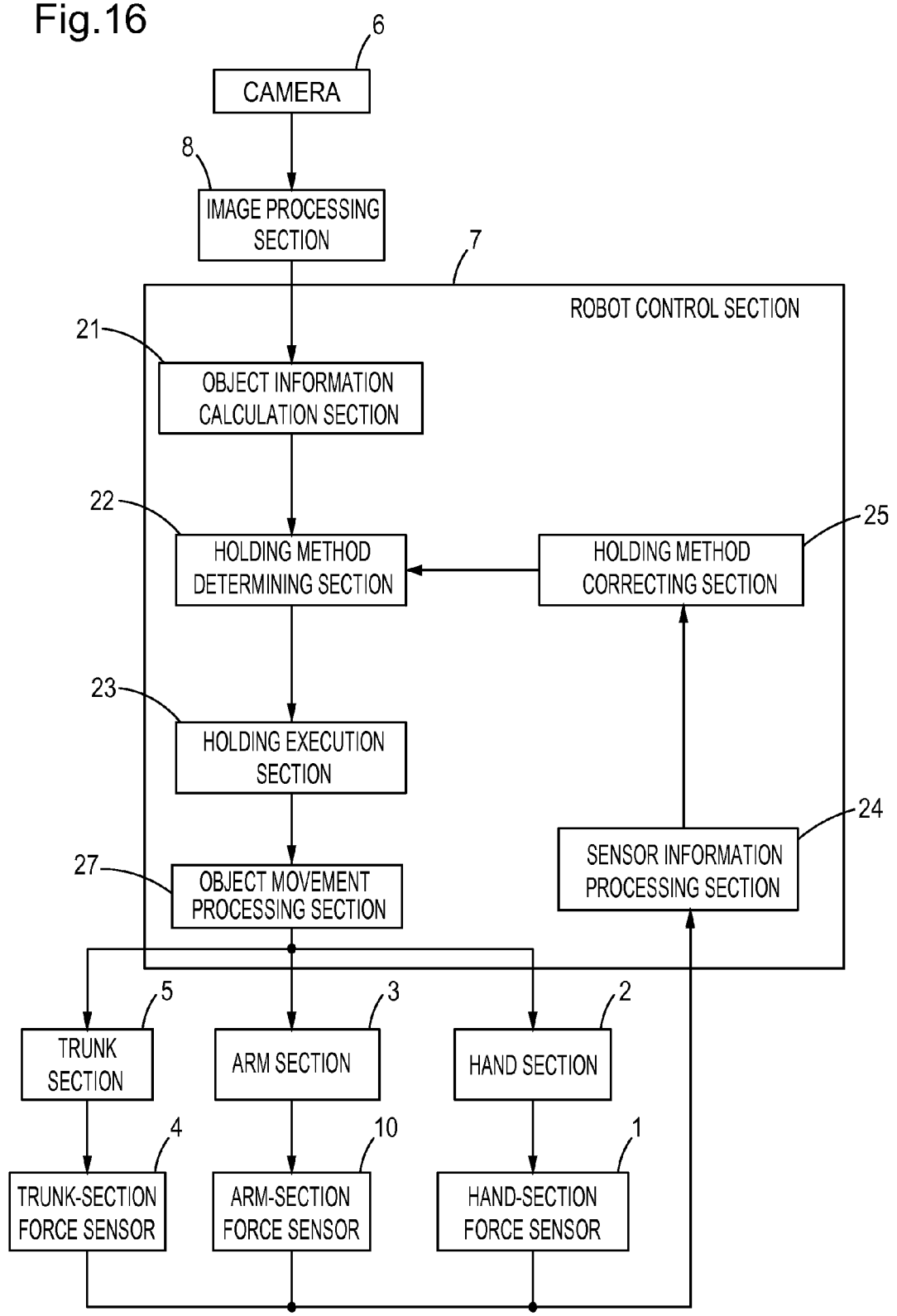
FIG. 16 is a configuration diagram of a robot control section in a robot system according to a sixth embodiment of the present invention.

FIG. 16 is a configuration diagram of a robot control section in a robot system according to a sixth embodiment of the present invention.

In FIG. 16, 27 denotes an object movement processing section. Reference numerals that are the same as those in FIGS. 1 and 2 showing the first embodiment denote components that are the same as those in FIGS. 1 and 2, and description thereof will be omitted.

A feature of this embodiment is as follows.

That is, the robot control section 7 includes the object movement processing section 27 for selecting a part of the robot used for movement, that is, the hand section 2, the arm section 3, or the moving mechanism 11 for moving a main unit of the robot in a case where the moving mechanism 11 is provided, in accordance with an amount of movement of the object when the object is held and moved.

Figure 17:
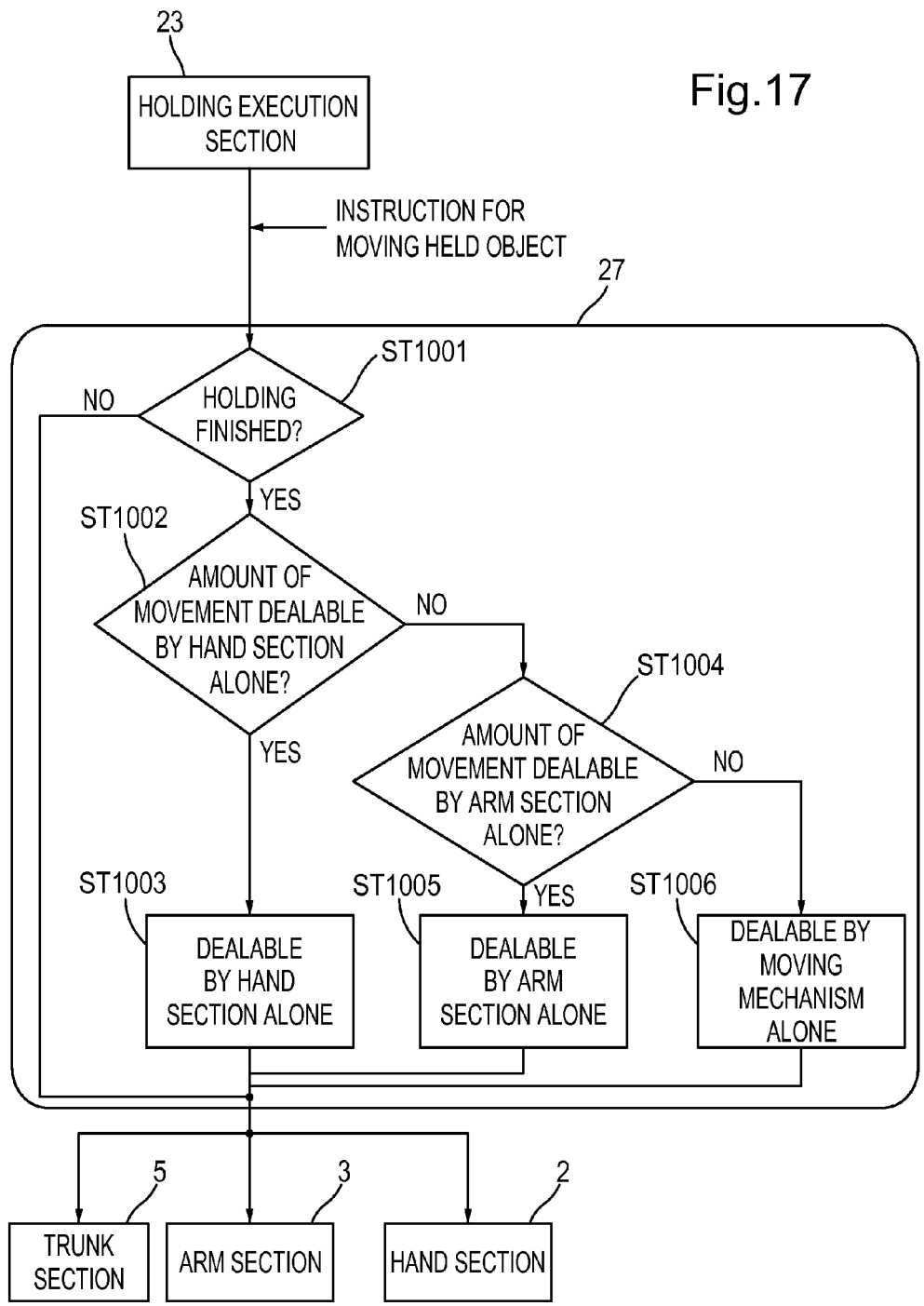
FIG. 17 is a flowchart for explaining an operation of an object movement processing section in the robot system according to the sixth embodiment of the present invention.

FIG. 17 is a flowchart for explaining an operation of the object movement processing section in the robot system according to the sixth embodiment of the present invention.

Now, an operation of the object movement processing section 27 in the robot system according to this embodiment will be described with reference to FIG. 17.

While holding is being executed by the holding execution section 23, if an object moving instruction, such as a disturbance avoiding instruction, is received based on, for example, information from a teaching pendant (not shown) or the sensor information processing section 24, in step ST1001, it is determined whether the execution of holding is an operation in which holding has been finished. If holding has not been finished, the sensor information processing section 24 controls holding force based on sensor information from the individual sensors, and the holding method correction section 25 corrects the holding method if it is determined that the holding method must be corrected. If it is determined in step ST1001 that the execution of holding is an operation in which holding has been finished, in step ST1002, it is determined whether the amount of movement according to the instruction for moving the object, received earlier, can be dealt with by the hand section 2 alone. If the amount of movement does not exceed the movable range of the hand section 2, in step ST1003, the object held is moved by the hand section 2 alone. If the amount of movement exceeds the movable range of the hand section 2, in step ST1004, it is determined whether the amount of movement according to the instruction for moving the object, received earlier, can be dealt with by the arm section 3 alone. If the amount of movement does not exceed the movable range of the arm section 3, in step ST1005, the object held is moved by the arm section 3 alone. If the amount of movement exceeds the movable range of the arm section 3, in step ST1006, the object held is moved by the moving mechanism 11.

As described above, in the robot system according to this embodiment, upon receiving an instruction for moving an object while the object is held, moving means is determined in consideration of movable ranges of individual moving means. Thus, it is possible to move a held object safely and stably by an optimum method of moving the object.

Seventh Embodiment

Figure 18:
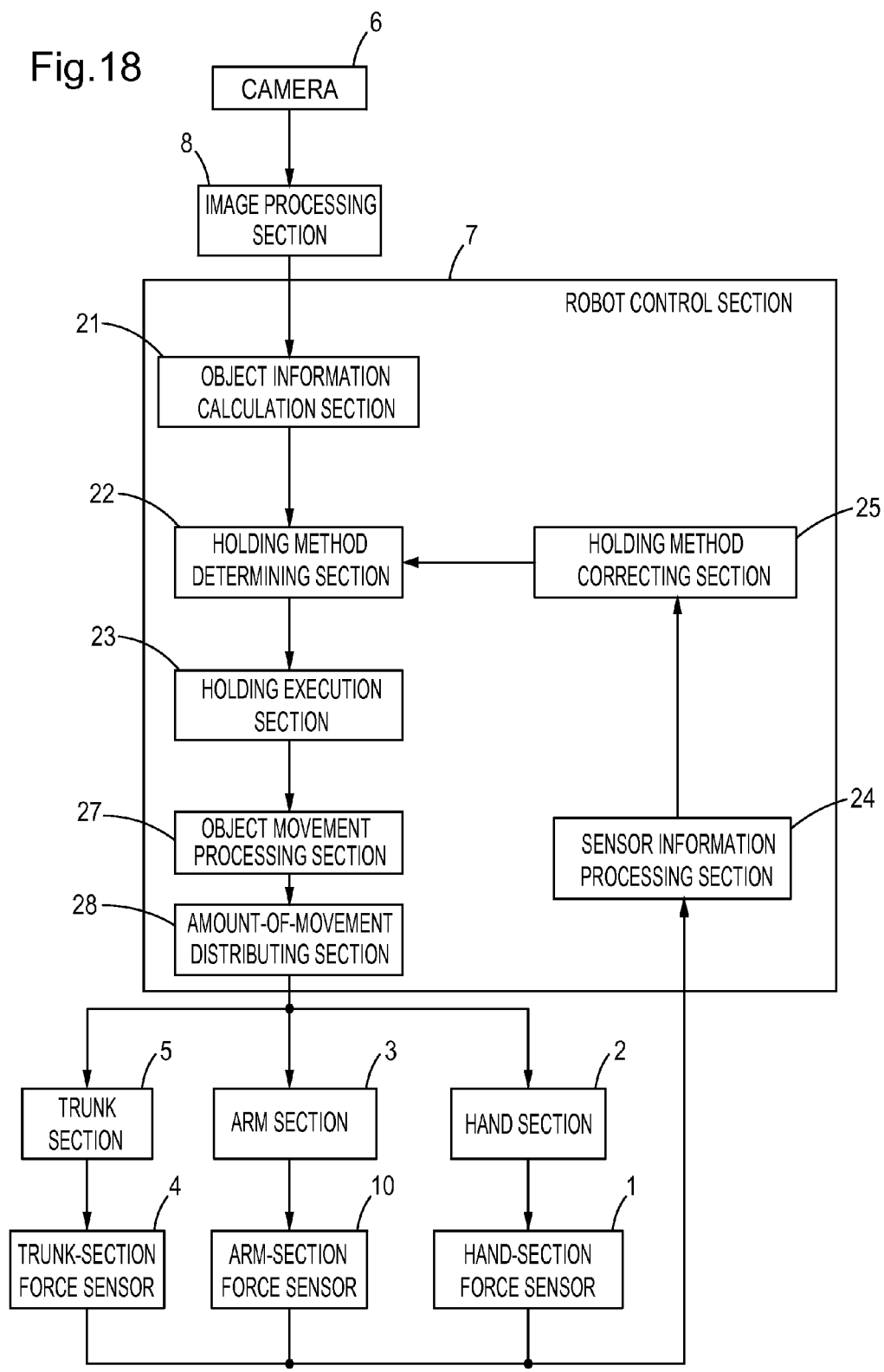
FIG. 18 is a configuration diagram of a robot control section in a robot system according to a seventh embodiment of the present invention.
Figure 19:
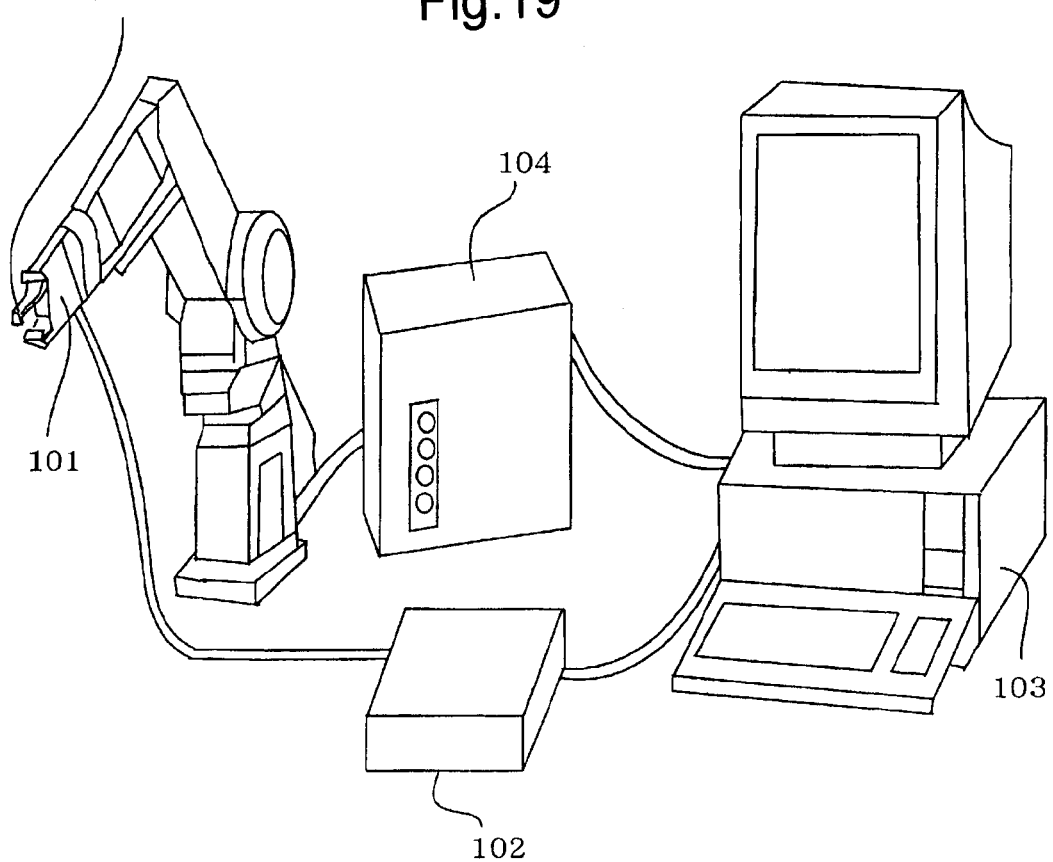
FIG. 19 is an overall configuration diagram of a robot that uses a holding method according to Patent Document 1 showing existing art.
Figure 20:
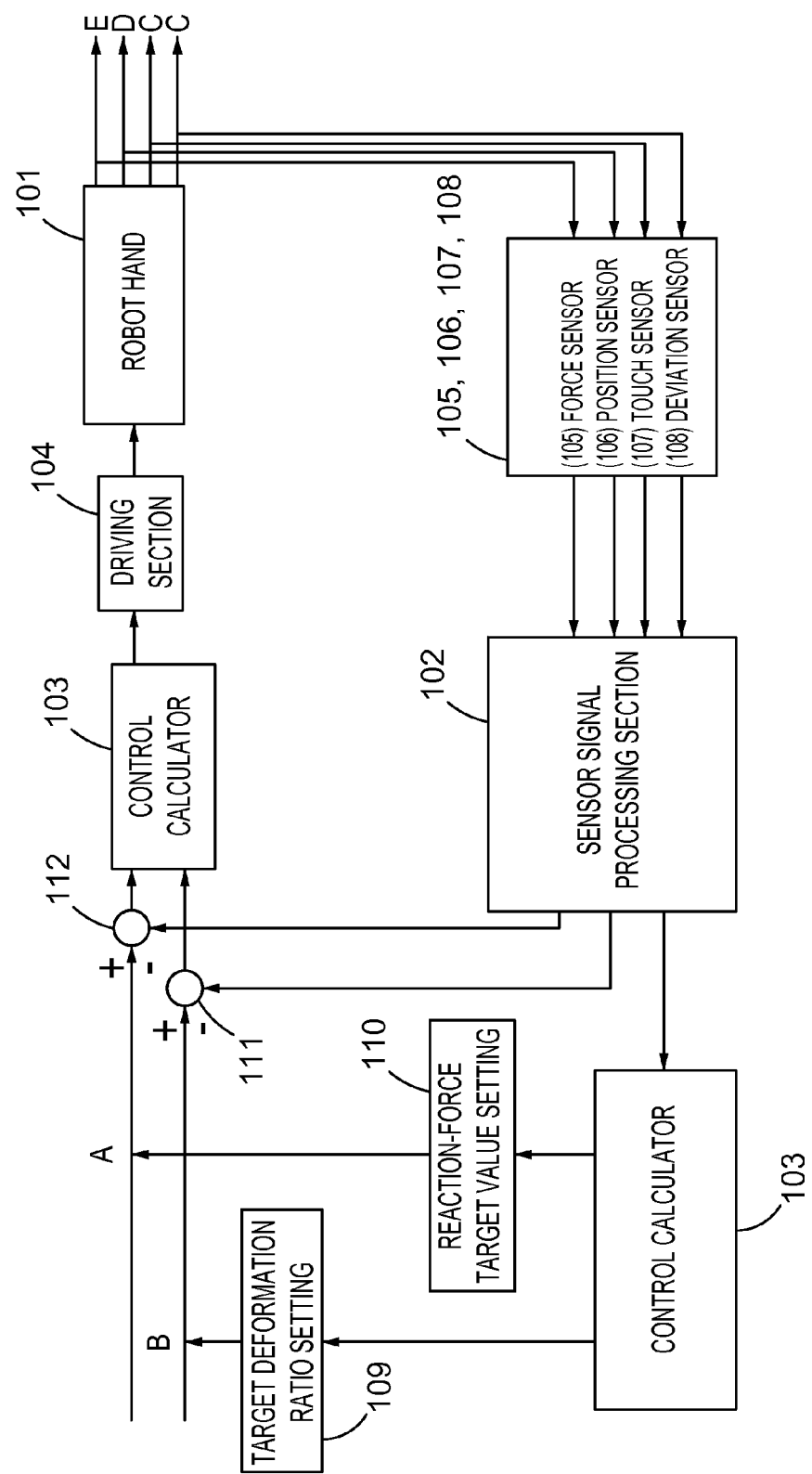
FIG. 20 is a control block diagram of a robot system according to Patent Document 1 showing existing art.
Figure 21:
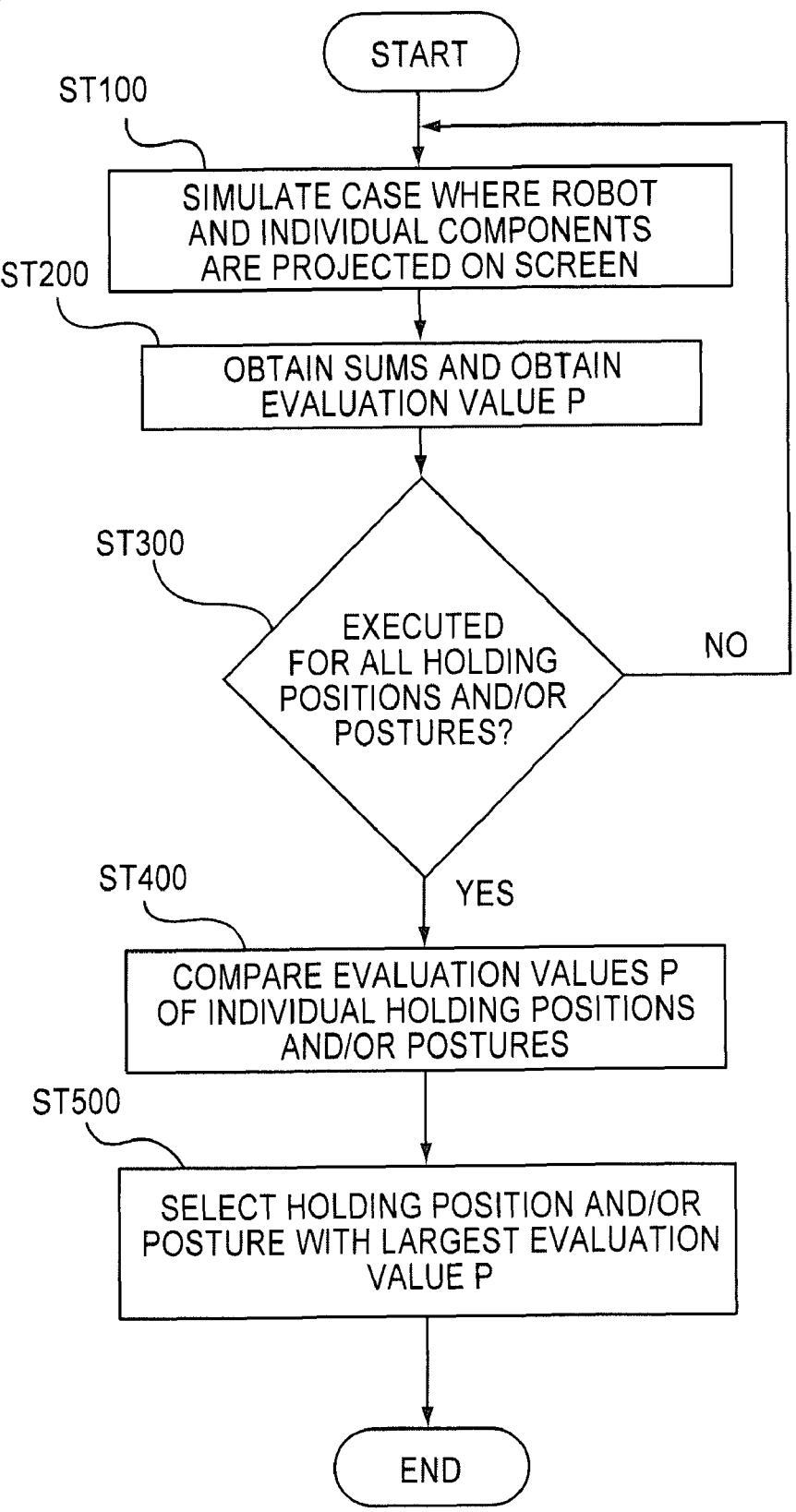
FIG. 21 is a flowchart for explaining an operation of a robot system according to Patent Document 2 showing existing art.

FIG. 18 is a configuration diagram of a robot control section in a robot system according to a seventh embodiment of the present invention.

In FIG. 18, 28 denotes an amount-of-movement distributing section. Reference numerals that are the same as those in FIG. 16 showing the sixth embodiment denote components that are the same as those in FIG. 16, and description thereof will be omitted.

This embodiment differs from the sixth embodiment in the following respect.

That is, the robot control section 7 in this embodiment includes the amount-of-movement distributing section 28 for distributing, based on remaining amounts to movable limits of individual joints of the hand section 2 and/or the arm section 3, amounts of movement of the individual parts of the robot used to move the object when the object is held and moved.

Now, an operation of the amount-of-movement distributing section 28 in the robot system according to this embodiment will be described with reference to FIG. 18.

Upon the robot control section 7 receiving an instruction for moving a held object, the amount-of-movement distributing section 28 distributes the amounts of movement of the individual parts, processed by the object movement processing section 27, to the individual parts so that the individual parts can deal with the amounts of movement, with priority given to parts having margins with reference to movable limits. For example, if, in a certain holding posture, the amount of movement of the held object instructed is 15 mm, the hand section has a margin of 20 mm with reference to the movable limit, and the arm section has a margin of 10 mm with reference to the movable limit, the hand section is moved by 10 mm and the arm section is moved by 5 mm.

As described above, in the robot system according to this embodiment, upon receiving an instruction for moving a held object, the amounts of movement is distributed to the individual parts so that the individual parts can deal with the amounts of movement. Thus, it is possible to move a held object safely and stably by an optimum method of moving the object while avoiding an unreasonable posture of the robot.

INDUSTRIAL APPLICABILITY

In a robot system according to the present invention, a holding method is determined using camera images and sensor information at the tips of fingers or at a trunk section. Thus, it is possible to avoid occurrence of an excessive holding power. Accordingly, application is possible to a robot apparatus that works in cooperation with a human.

The invention claimed is:
1. A robot system comprising:
a hand section having a plurality of fingers, each finger with a hand-section force sensor provided at a distal end thereof;
one or more arm sections having the hand section at a distal end thereof;
a trunk section having the arm sections and on which a trunk-section force sensor is provided;
a camera for measuring a shape of an object;
a robot control section for controlling movement of the arm sections; and
an image processing section for processing an image acquired by the camera;
wherein the robot control section includes:
an object information calculating section for calculating, based on image information from the image processing section, a size and shape of the object to be held;
a holding method determining section for determining, based on the object information calculated by the object information calculating section, a holding method for holding the object;
a holding execution section for executing lifting of the object by the holding method determined by the holding method determining section;
a sensor information processing section for processing pieces of sensor information of the hand-section force sensor and the trunk-section force sensor, for making a decision regarding slip and instability based on the sensor information, for selecting the holding method, for controlling a holding force based on the slip and instability decision and the sensor information of the hand-section force sensor if holding by two or more of the plurality of fingers or by the entire hand section, and for controlling an embracing force based on the slip and instability decision and the sensor information of the trunk-section force sensor if holding with the hand sec- tion and a portion of the arm sections, the pieces of sensor information being those obtained at a time of the execution; and a holding method correction section for correcting, based on a result of the sensor information processed by the sensor information processing section and the object information calculated by the object information calculating section, the holding method, wherein holding with three fingers of one hand, holding the object with five fingers of one hand, or holding the object entirely with one hand is selected as the holding method in a case where the number of the arm sections provided, having the hand section with five fingers, is one, and wherein holding the object with three fingers of one hand, holding the object with five fingers of one hand, holding the object entirely with one hand, holding the object with entire both hands, or holding the object with the hand section and a portion of both arms is selected as the holding method in a case where the number of the arm sections provided, having the hand section with five fingers, is two.

2. The robot system according to claim 1, comprising a storage section for storing inherent attribute information regarding the object as object data when the object is held, and maintaining the object data.

3. The robot system according to claim 2, wherein the object data stored in the storage section when the object is held is one or more pieces of data regarding the object, such as a size, shape, mass, or shade of the object, and data regarding a holding method.

4. The robot system according to claim 1, wherein the arm section includes:
an arm-section force sensor for measuring a load on the arm section, and
wherein the robot control section controls the embracing force by using the arm-section force sensor in combination with the trunk-section force sensor.

5. The robot system according to claim 1, wherein the holding method determining section calculates a holding position of the object to be held and determines the holding method based on the object information calculated by the object information calculation section.

6. A robot system comprising:
a hand section having a finger with a hand-section force sensor provided at a distal end thereof;
one or more arm sections having the hand section at a distal end thereof;
a trunk section having the arm sections and on which a trunk-section force sensor is provided;
a camera for measuring a shape of an object; and
a moving mechanism for moving a position of the entire robot to position the object to be held where it is easy to hold the object, including holding with both the hand section and a portion of the arm sections, based on the size and shape of the object obtained from the image of the camera and sensor information from the hand-section force sensor and the trunk-section force sensor.

7. The robot system according to claim 1, wherein the robot control section includes:
an indicating section for determining, based on the object information, whether it is possible to hold the object, and for indicating that holding is not possible when it is determined that holding is not possible.

8. The robot system according to claim 1, wherein the object information calculation section includes:
an ID tag reading section for recognizing the object to be held from an ID tag provided on the object.

9. The robot system according to claim 1, wherein the robot control section includes:
an object movement processing section for selecting a part of the robot used for movement, that is, the hand section, the arm section, or a moving mechanism for moving a main unit of the robot in a case where the moving mechanism is provided, in accordance with an amount of movement of the object when the object is held and moved.

10. A robot system comprising:
a hand section having a finger with a hand-section force sensor provided at a distal end thereof;
one or more arm sections having the hand section at a distal end thereof;
a trunk section having the arm sections and on which a trunk-section force sensor is provided;
a camera for measuring a shape of an object; and
a robot control section controlling a holding force and a holding method for the object, including holding with the hand section and a portion of the arm sections, using sensor information from the hand-section force sensor and the trunk-section force sensor, and having an amount-of-movement distributing section for distributing, based on remaining amounts to movable limits of individual joints of the hand section or the arm section, amounts of movement of the individual parts of the robot used to move the object when the object is held and moved.

* * * * *